United States Patent
Ichikawa et al.

(10) Patent No.: US 8,188,710 B2
(45) Date of Patent: May 29, 2012

(54) MOTORED VEHICLE AND METHOD OF CONTROLLING VOLTAGE CONVERSION DEVICE FOR RAPIDLY CHARGING A POWER STORAGE DEVICE

(75) Inventors: Shinji Ichikawa, Toyota (JP); Hichirosai Oyobe, Toyota (JP); Naoto Suzuki, Fujinomiya (JP); Tetsuhiro Ishikawa, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 426 days.

(21) Appl. No.: 12/311,624

(22) PCT Filed: Nov. 7, 2007

(86) PCT No.: PCT/JP2007/072057
§ 371 (c)(1),
(2), (4) Date: Apr. 7, 2009

(87) PCT Pub. No.: WO2008/056818
PCT Pub. Date: May 15, 2008

(65) Prior Publication Data
US 2010/0026237 A1 Feb. 4, 2010

(30) Foreign Application Priority Data
Nov. 8, 2006 (JP) .................. 2006-303080

(51) Int. Cl.
*H02J 7/00* (2006.01)
(52) U.S. Cl. .................. 320/109; 320/150
(58) Field of Classification Search .......... 320/109
See application file for complete search history.

(56) References Cited

U.S. PATENT DOCUMENTS

| | | | |
|---|---|---|---|
| 5,905,360 | A | 5/1999 | Ukita |
| 5,929,595 | A | 7/1999 | Lyons et al. |
| 6,078,163 | A | 6/2000 | Horie et al. |
| 6,483,272 | B1 * | 11/2002 | Terada et al. ......... 320/103 |
| 6,583,519 | B2 * | 6/2003 | Aberle et al. ........ 307/10.1 |
| 7,230,395 | B2 | 6/2007 | Horii |
| 2002/0113441 | A1 | 8/2002 | Obayashi |
| 2006/0220601 | A1 | 10/2006 | Horii |

(Continued)

FOREIGN PATENT DOCUMENTS

CN 1481059 A 3/2004

(Continued)

OTHER PUBLICATIONS

May 4, 2010 Office Action (Notice of Allowance) issued in Russian Patent Application No. 2009121552/11(029787) (with English translation).

(Continued)

*Primary Examiner* — Arun Williams
(74) *Attorney, Agent, or Firm* — Oliff & Berridge, PLC

(57) ABSTRACT

In charging first and second power storage devices from a charging station, an inverter ECU controls first and second inverters to convert AC power received at first and second neutral points into DC power and output the DC power to a power supply system. A converter ECU converts in voltage the electric power received from the first and second inverters to be charged and outputs the converted electric power to the first and second power storage devices, and for low temperature, controls first and second converters to allow the first and second power storage devices to communicate electric power therebetween.

15 Claims, 16 Drawing Sheets

U.S. PATENT DOCUMENTS

2007/0013325 A1* 1/2007 Kiuchi et al. .................. 318/34

FOREIGN PATENT DOCUMENTS

| CN | 1841880 A | 10/2006 |
|---|---|---|
| JP | A-07-250405 | 9/1995 |
| JP | A-07-336811 | 12/1995 |
| JP | A-10-014014 | 1/1998 |
| JP | A-10-066267 | 3/1998 |
| JP | A-11-329516 | 11/1999 |
| JP | A-2003-274565 | 9/2003 |
| JP | A-2004-015866 | 1/2004 |
| JP | A-2005-332777 | 12/2005 |
| JP | A-2006-121874 | 5/2006 |
| JP | A-2006-304393 | 11/2006 |
| RU | 2 223 183 C2 | 2/2004 |
| WO | WO 2006/112510 A1 | 10/2006 |

OTHER PUBLICATIONS

Office Action issued in Chinese Application No. 200780041164.7 dated Jun. 14, 2011 (with translation).

* cited by examiner

MOTORED VEHICLE AND METHOD OF CONTROLLING VOLTAGE CONVERSION DEVICE FOR RAPIDLY CHARGING A POWER STORAGE DEVICE

TECHNICAL FIELD

The present invention relates generally to motored vehicles and methods of controlling voltage conversion devices and particularly to motored vehicles having a plurality of power storage devices and capable of charging the plurality of power storage devices from a power supply external to the vehicle and methods of controlling voltage conversion devices mounted therein.

BACKGROUND ART

In recent years, as environmental issues are being discussed, attention is being given to hybrid vehicles, electric vehicles and other similar motored vehicles. These vehicles have mounted therein a motive power source implemented by a motor and an electric power source therefor implemented by a secondary battery, a capacitor or a similar power storage device.

Generally, a secondary battery, a capacitor or a similar power storage device decreases in capacity when temperature decreases, and as a result they have a decreased charging/discharging characteristic. Accordingly, when the power storage device has a decreased temperature, ensuring that the power storage device has a sufficient charging/discharging characteristic requires rapidly increasing the temperature of the power storage device.

Japanese Patent Laying-open No. 2004-15866 discloses a charging/discharging control device capable of increasing the temperature of a secondary battery in a short period of time. The charging/discharging control device charges/discharges a power storage device to attain a state of charge (SOC) allowing the secondary battery to generate heat in a maximum amount. The secondary battery can be increased in temperature in a short period of time and the power storage device's dischargeable output and chargeable input can be improved in a short period of time.

A power storage device mounted in a motored vehicle is often charged from a power supply external to the vehicle at midnight, since midnight electric power is inexpensive. At midnight, however, temperature is low, and the power storage device has a decreased charging characteristic. The power storage device may thus not be charged to its fully charged state.

The Japanese Patent Laying-open No. 2004-15866 describes that, to increase the secondary battery's temperature, the charging/discharging control device charges/discharges the power storage device to attain an SOC that allows the secondary battery to generate heat in a maximum amount. When a power storage device is charged from a power supply external to the vehicle, however, it is done so to its fully charged state, and the SOC cannot be controlled to have a value allowing the secondary battery to generate heat in a maximum amount. As such, the technique described in Japanese Patent Laying-open No. 2004-15866 cannot be used to charge a power storage device from a power supply external to a vehicle.

DISCLOSURE OF THE INVENTION

Accordingly the present invention has been made to overcome such disadvantage, and it contemplates a motored vehicle capable of rapidly increasing a power storage device in temperature to charge the power storage device in a short period of time when the power storage device is charged from a power supply external to the vehicle.

The present invention also contemplates a method of controlling a voltage conversion device mounted in a motored vehicle capable of rapidly increasing a power storage device in temperature to charge the power storage device in a short period of time when the power storage device is charged from a power supply external to the vehicle.

The present invention provides a motored vehicle including a plurality of chargeable power storage devices, a motor, an electric power receiving unit, a voltage conversion device, and a control device. The motor uses electric power received from the plurality of power storage devices to generate driving power for the vehicle. The electric power receiving unit receives electric power from a power supply external to the vehicle for charging the plurality of power storage devices. The voltage conversion device is connected to the electric power receiving unit and the plurality of power storage devices, and configured to convert in voltage the electric power that the electric power receiving unit receives and output the converted electric power to the plurality of power storage devices, and also allow the plurality of power storage devices to communicate electric power therebetween. The control device controls the voltage conversion device to allow the plurality of power storage devices to communicate electric power therebetween when the plurality of power storage devices are charged from the power supply external to the vehicle.

Preferably, the control device determines the electric power communicated between the plurality of power storage devices, as based on the electric power that the electric power receiving unit receives.

Still preferably, the control device determines, as the electric power communicated between the plurality of power storage devices, an electric power obtained by subtracting, from an allowable input electric power of a power storage device of the plurality of power storage devices that serves as an electric power receiving side when the plurality of power storage devices communicate electric power therebetween, an electric power supplied from the electric power receiving unit to the power storage device serving as the electric power receiving side.

Preferably, the control device controls the voltage conversion device to allow the plurality of power storage devices to communicate the electric power therebetween when any of the plurality of power storage devices has a temperature less than or equal to a defined temperature.

Preferably, the power supply external to the vehicle is a commercial AC power supply. The voltage conversion device includes a first conversion unit, an electric power line, and a plurality of second conversion units. The first conversion unit receives AC power from the commercial AC power supply and converts the received AC power to DC power. The electric power line outputs the DC power received from the first conversion unit. The plurality of second conversion units are associated with the plurality of power storage devices and each convert voltage between the electric power line and a power storage device of the plurality of power storage devices that is associated with the second conversion unit.

Still preferably, the plurality of power storage devices include first and second power storage devices. The plurality of second conversion units include first and second converters. The control device includes a current control unit and a voltage control unit. The current control unit controls the first converter to allow the first power storage device to charge/ discharge a target current. The voltage control unit controls the second converter to allow the electric power line to have a target voltage.

Furthermore, still preferably, the plurality of power storage devices include first and second power storage devices. The plurality of second conversion units include first and second converters. The control device includes a first current control unit and a second current control unit. The first current control unit controls the first converter to allow the first power storage device to charge/discharge a first target current. The second current control unit controls the second converter to allow the second power storage device to charge/discharge a second target current.

Furthermore, still preferably, the motor is a first AC rotating electric machine including a star-connected first polyphase winding as a stator winding. The first conversion unit includes the first AC rotating electric machine, a second AC rotating electric machine, first and second inverters, and an inverter control unit. The second AC rotating electric machine includes a star-connected second polyphase winding as a stator winding. The first and second inverters are associated with the first and second AC rotating electric machines, respectively, and connected in parallel with each other to the electric power line. The inverter control unit controls the first and second inverters. The electric power receiving unit provides the AC power received from the commercial AC power supply to the first polyphase winding and the second polyphase winding at a first neutral point and a second neutral point, respectively, and the inverter control unit controls the first and second inverters to convert the AC power received at the first and second neutral points into DC power and output the DC power to the electric power line.

Furthermore, the present invention provides a method of controlling a voltage conversion device mounted in a motored vehicle including a plurality of chargeable power storage devices, a motor, an electric power receiving unit, the voltage conversion device, and a control device. The motor uses electric power received from the plurality of power storage devices to generate driving power for the vehicle. The electric power receiving unit receives electric power from a power supply external to the vehicle for charging the plurality of power storage devices. The voltage conversion device is connected to the electric power receiving unit and the plurality of power storage devices, and configured to convert in voltage the electric power that the electric power receiving unit receives and output the converted electric power to the plurality of power storage devices, and also allow the plurality of power storage devices to communicate electric power therebetween. The method includes the steps of: determining whether charging the plurality of power storage devices from the power supply is requested; and when charging the plurality of power storage devices from the power supply is requested, controlling the voltage conversion device to charge the plurality of power storage devices from the power supply and also allow the plurality of power storage devices to communicate electric power therebetween.

Preferably, the method of controlling a voltage conversion device further includes the step of determining the electric power communicated between the plurality of power storage devices, as based on the electric power that the electric power receiving unit receives, and the step of controlling includes controlling the voltage conversion device to allow the plurality of power storage devices to communicate therebetween the electric power determined in the step of determining the electric power.

Still preferably, in the step of determining the electric power, an electric power obtained by subtracting, from an allowable input electric power of a power storage device of the plurality of power storage devices that serves as an electric power receiving side when the plurality of power storage devices communicate electric power therebetween, an electric power supplied from the electric power receiving unit to the power storage device serving as the electric power receiving side, is determined as the electric power communicated between the plurality of power storage devices.

Preferably, the method of controlling a voltage conversion device further includes the step of determining whether any of the plurality of power storage devices has a temperature less than or equal to a defined temperature, and when in the step of determining whether any of the plurality of power storage devices has a temperature less than or equal to the defined temperature a decision is made that any of the plurality of power storage devices has a temperature less than or equal to the defined temperature, then in the step of controlling, the voltage conversion device is controlled to allow the plurality of power storage devices to communicate electric power therebetween.

In accordance with the present invention a voltage conversion device converts in voltage an electric power that an electric power receiving unit receives and outputs the converted electric power to a plurality of power storage devices. Furthermore, the voltage conversion device is configured to allow the plurality of power storage devices to communicate electric power therebetween. When the plurality of power storage devices are charged from a power supply external to the vehicle, a control device controls the voltage conversion device to allow the plurality of power storage devices to communicate electric power therebetween. Thus while the plurality of power storage devices are charged from the power supply external to the vehicle, the plurality of power storage devices communicate electric power therebetween. As a result, after charging is started, the plurality of power storage devices are rapidly increased in temperature.

Thus in accordance with the present invention after charging is started the power storage devices can have a rapidly increasing charging characteristic and be charged from a power supply external to the vehicle in a short period of time.

BEST MODES FOR CARRYING OUT THE INVENTION

Figure 1:
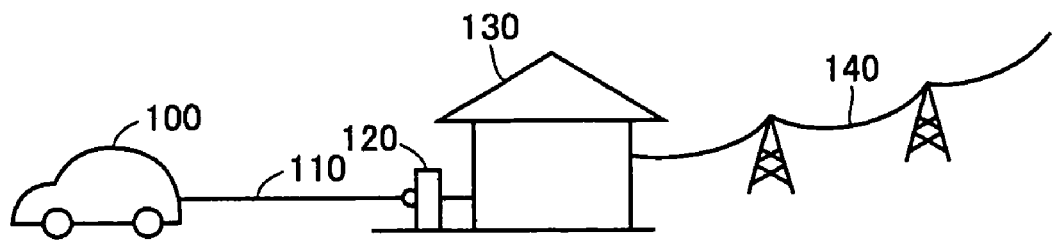
FIG. 1 generally shows a system supplying electric power to a motored vehicle according to the present invention.

Hereinafter reference will be made to the drawings to describe the present invention in embodiments. In the following description, identical or like components are denoted by identical reference characters. Accordingly, they will not be described repeatedly in detail.

First Embodiment

FIG. 1 generally shows a system supplying electric power to a motored vehicle according to the present invention. With reference to FIG. 1, an electric power supply system 200 includes a motored vehicle 100, a charging cable 110, a charging station 120, a residence 130, and a system power supply 140.

Motored vehicle 100 has a plurality of chargeable power storage devices mounted therein as a direct current (DC) power supply, and uses electric power received from the plurality of power storage devices to operate a motor to generate driving power for the vehicle. Furthermore, motored vehicle 100 is electrically connectable through charging cable 110 to charging station 120, and motored vehicle 100 can receive electric power by a method, as will be described hereinafter, from charging station 120 through charging cable 110 to charge the plurality of power storage devices.

Charging cable 110 is an electric power line for charging from charging station 120 the plurality of power storage devices mounted in motored vehicle 100. Charging station 120 receives electric power from system power supply 140 via residence 130, and supplies the electric power to motored vehicle 100 connected by charging cable 110. Residence 130 supplies charging station 120 with a portion of electric power received from system power supply 140.

Figure 2:
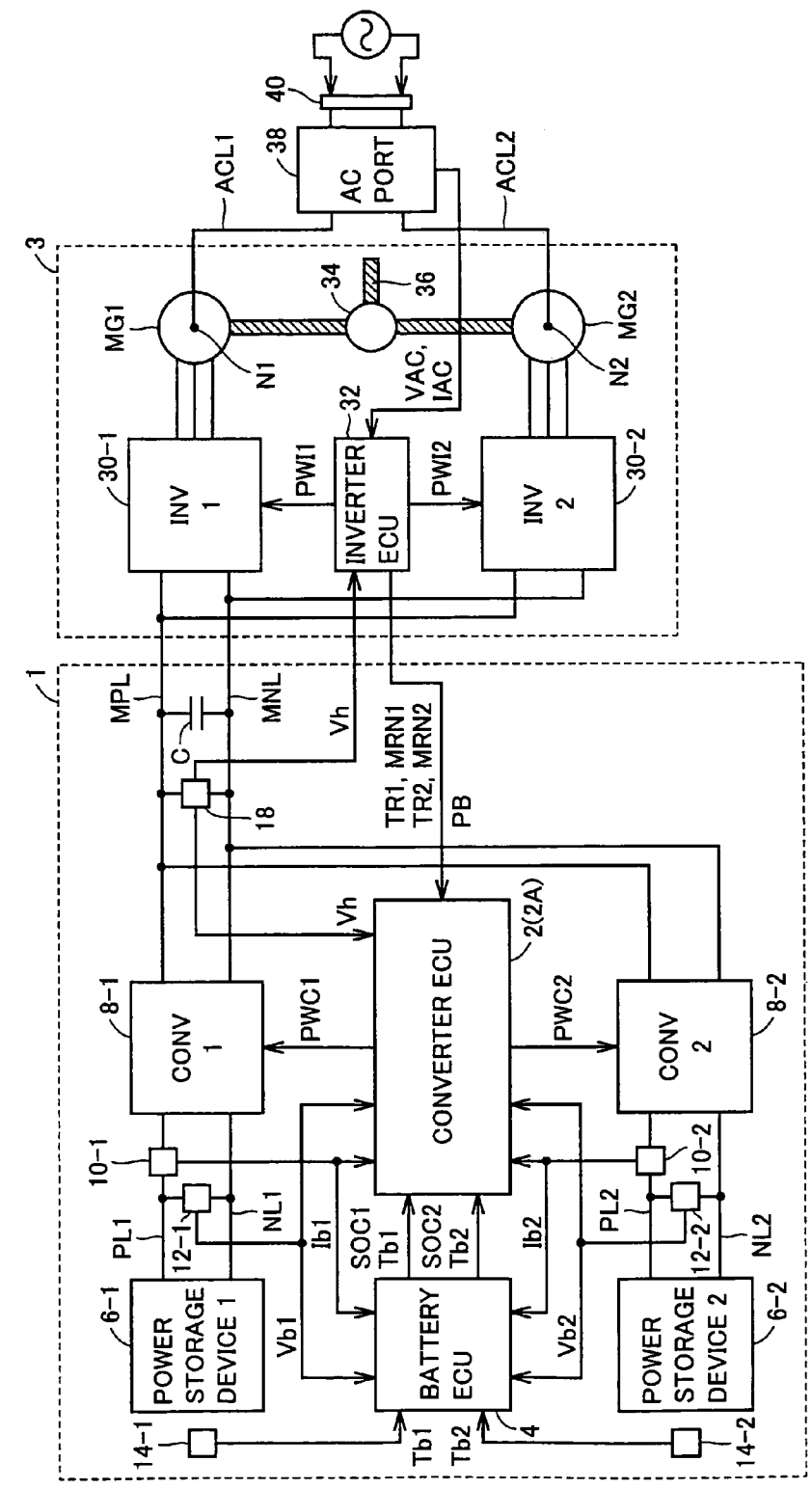
FIG. 2 is a general block diagram of the motored vehicle in a first embodiment.

FIG. 2 is a general block diagram of the motored vehicle in the first embodiment. With reference to FIG. 2, motored vehicle 100 includes a power supply system 1, a driving power generation unit 3, electric power input lines ACL1, ACL2, an AC port 38, and a connector 40.

Driving power generation unit 3 includes inverters 30-1, 30-2, motor generators MG1, MG2, a motive power transmission mechanism 34, a drive shaft 36, and an inverter electronic control unit (ECU) 32.

Inverters 30-1 and 30-2 are connected in parallel with each other to main positive and negative buses MPL and MNL, and inverters 30-1, 30-2 receive driving electric power (DC power) from power supply system 1, convert the received DC power to AC power, and output the AC power to motor generators MG1 and MG2, respectively. Furthermore, inverters 30-1 and 30-2 receive AC power generated by motor generators MG1, MG2, respectively, convert the AC power into DC power, and output the DC power as regenerated electric power to power supply system 1.

Motor generators MG1 and MG2 receive AC power from inverters 30-1 and 30-2, respectively, to generate rotary driving power. Furthermore, motor generators MG1, MG2 receive external rotary force to generate AC power. Motor generator MG1, MG2 is formed for example of a 3 phase AC rotating electric machine including a rotor having a permanent magnet embedded therein and a stator having a Y-connected 3 phase coil, and motor generators MG1, MG2 are coupled with motive power transmission mechanism 34, which is coupled with drive shaft 36 to allow rotary driving power to be transmitted to a wheel (not shown).

It should be noted that if driving power generation unit 3 is applied to a hybrid vehicle, motor generators MG1, MG2 are also coupled with an engine (not shown) via motive power transmission mechanism 34 or drive shaft 36, and inverter ECU 32 exerts control to allow the engine and motor generators MG1, MG2 to generate their respective driving powers at an optimal ratio. In application to such a hybrid vehicle, one of motor generators MG1, MG2 may be functioned exclusively as a motor and the other may be functioned exclusively as an electric power generator.

Electric power input line ACL1 electrically connects a neutral point N1 of motor generator MG1 to AC port 38. Electric power input line ACL2 electrically connects a neutral point N2 of motor generator MG2 to AC port 38.

Although not shown, AC port 38 includes a relay connecting/disconnecting electric power input lines ACL1, ACL2 and connector 40, and a voltage sensor and a current sensor detecting voltage VAC and current IAC, respectively, of electric power (AC power) received from connector 40, and AC port 38 outputs to inverter ECU 32 the voltage VAC and current IAC detected.

Connector 40 is an input terminal for inputting AC power received from charging station 120 (FIG. 1). Connector 40 inputs the received AC power which is in turn passed through AC port 38 and electric power input lines ACL1, ACL2 to motor generators MG1, MG2 and received at neutral points N1, N2.

Inverter ECU 32 calculates target torque values TR1, TR2 and target rotation speed values MRN1, MRN2 for motor generators MG1, MG2 from signals, a traveling condition, an accelerator pedal position and the like that are transmitted from sensors (not shown), and inverter ECU 32 generates a drive signal PWI1 to control inverter 30-1 to allow motor generator MG1 to generate a torque having target torque value TR1 and have a speed having target rotation speed value MRN1. Furthermore, inverter ECU 32 generates a drive signal PWI2 to control inverter 30-2 to allow motor generator MG2 to generate a torque having target torque value TR2 and have a speed having target rotation speed value MRN2. Note that inverter ECU 32 outputs the calculated target torque values TR1, TR2 and target rotation speed values MRN1, MRN2 to converter ECU 2, which will be described later, of power supply system 1.

Furthermore, when power storage devices 6-1, 6-2, which will be described later, are charged from charging station 120, inverter ECU 32 controls inverters 30-1, 30-2, as based on voltage VAC and current IAC, by a method described later to convert the AC power that is provided to motor generators MG1, MG2 at neutral points N1, N2 into DC power and output the DC power to power supply system 1. Note that inverter ECU 32 outputs to converter ECU 2 of power supply system 1 a charging electric power control value PB indicating a target value for electric power charged.

Power supply system 1 includes power storage devices 6-1, 6-2, converters 8-1, 8-2, a smoothing capacitor C, converter ECU 2, a battery ECU 4, current sensors 10-1, 10-2, voltage sensors 12-1, 12-2, 18, and temperature sensors 14-1, 14-2.

Power storage device 6-1, 6-2 is a chargeable DC power supply and formed for example of a nickel metal hydride battery, a lithium ion battery, or a similar secondary battery. Power storage device 6-1 is connected to converter 8-1 through a positive polar line PL1 and a negative polar line NL1. Power storage device 6-2 is connected to converter 8-2 through a positive polar line PL2 and a negative polar line NL2. Note that at least one of power storage devices 6-1, 6-2 may be configured of an electric double layer capacitor.

Converter 8-1 is provided between power storage device 6-1 and main positive and negative buses MPL and MNL and operates in response to a drive signal PWC1 received from converter ECU 2 to convert voltage between power storage device 6-1 and main positive and negative buses MPL and MNL. Converter 8-2 is provided between power storage device 6-2 and main positive and negative buses MPL and MNL and operates in response to a drive signal PWC2 received from converter ECU 2 to convert voltage between power storage device 6-2 and main positive and negative buses MPL and MNL.

Smoothing capacitor C is connected between main positive bus MPL and main negative bus MNL and reduces an electric power variation component contained in main positive and negative buses MPL and MNL. Voltage sensor 18 detects a voltage value Vh between main positive and negative buses MPL and MNL and outputs the detection result to converter ECU 2 and inverter ECU 32.

Current sensors 10-1, 10-2 detect a current value Ib1 and a current value Ib2 input/output to/from power storage device 6-1 and power storage device 6-2, respectively, and output their respective detection results to converter ECU 2 and battery ECU 4. Note that current sensors 10-1, 10-2 each detect a current that is output (or discharged) from its associated power storage device as a positive value, and a current that is input (or charged) to its associated power storage device as a negative value. Note that while FIG. 2 shows current sensors 10-1, 10-2 detecting the values of the currents on positive polar lines PL1, PL2, respectively, current sensors 10-1, 10-2 may detect the currents on negative polar lines NL1, NL2, respectively.

Voltage sensors 12-1, 12-2 detect a voltage value Vb1 of power storage device 6-1 and a voltage value Vb2 of power storage device 6-2, respectively, and output their respective detection results to converter ECU 2 and battery ECU 4. Temperature sensors 14-1, 14-2 detect temperature Tb1 internal to power storage device 6-1 and temperature Tb2 internal to power storage device 6-2, respectively, and output their respective detection results to battery ECU 4.

Battery ECU 4 calculates an amount of state SOC1 indicating an SOC of power storage device 6-1 from current value Ib1 received from current sensor 10-1, voltage value Vb1 received from voltage sensor 12-1, and temperature Tb1 received from temperature sensor 14-1, and outputs the calculated amount of state SOC1 to converter ECU 2 together with temperature Tb1.

Furthermore, battery ECU 4 calculates an amount of state SOC2 indicating an SOC of power storage device 6-2 from current value Tb2 received from current sensor 10-2, voltage value Vb2 received from voltage sensor 12-2, and temperature Tb2 received from temperature sensor 14-2, and outputs the calculated amount of state SOC2 to converter ECU 2 together with temperature Tb2. Note that amounts of states SOC1, SOC2 may be calculated with a variety of known methods.

Converter ECU 2 receives the values detected by current sensors 10-1, 10-2 and voltage sensors 12-1, 12-2, 18, temperatures Tb1, Tb2 and amounts of states SOC1, SOC2 from battery ECU 4, and target torque values TR1, TR2, target rotation speed values MRN1, MRN2 and charging electric power control value PB from inverter ECU 32, and therefrom generates drive signals PWC1, PWC2 for driving converters 8-1, 8-2, respectively, and converter ECU 2 outputs the generated drive signals PWC1, PWC2 to converters 8-1, 8-2, respectively, to control converters 8-1, 8-2. How converter ECU 2 is configured will be described later more specifically.

Figure 3:
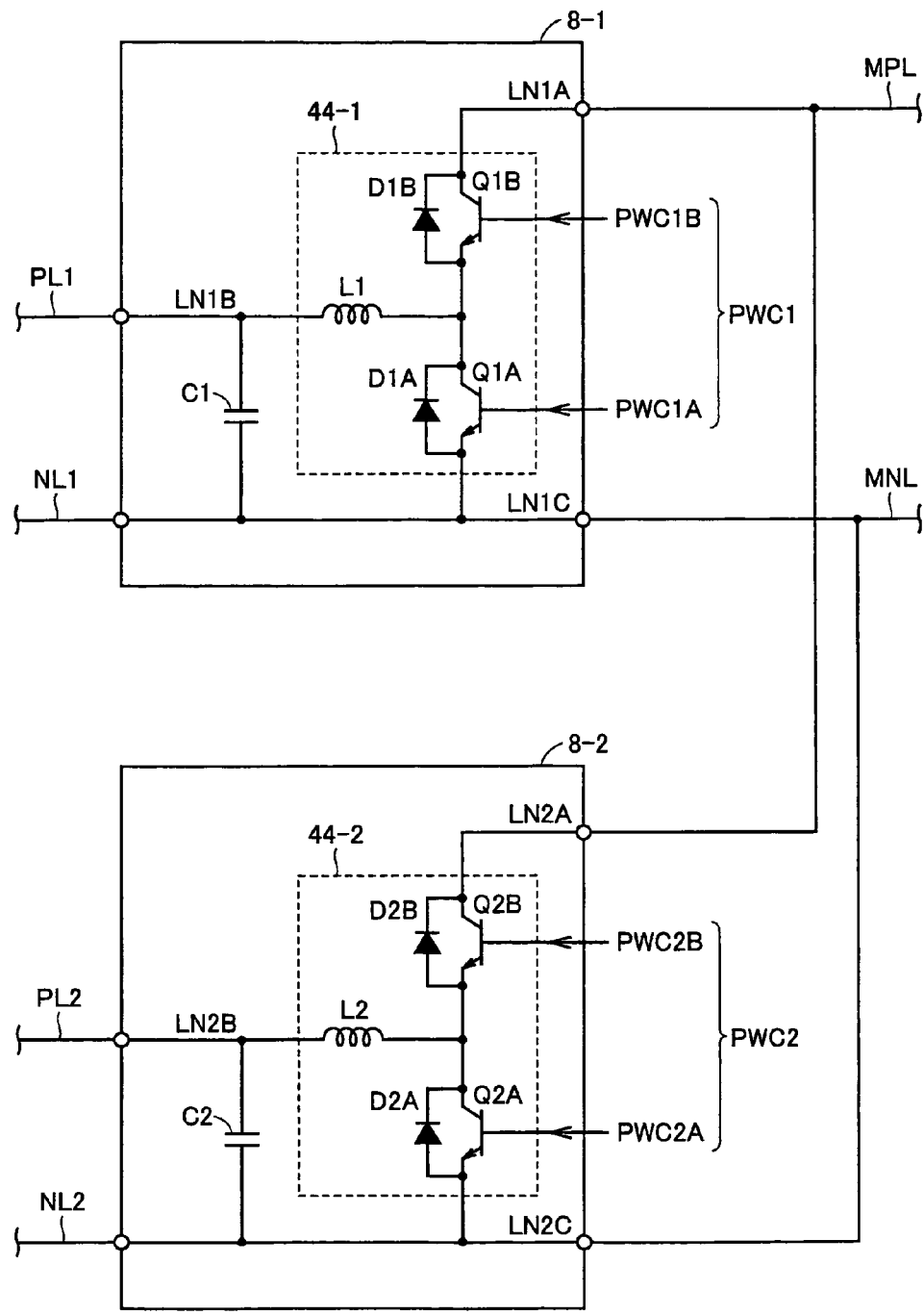
FIG. 3 generally shows a configuration of a converter shown in FIG. 2.

FIG. 3 generally shows a configuration of converters 8-1, 8-2 shown in FIG. 2. Converter 8-2 is similar in configuration to converter 8-1. Accordingly hereinafter the configuration of converter 8-1 will representatively be described. With reference to FIG. 3, converter 8-1 includes a chopper circuit 44-1, a positive bus LN1A, a negative bus LN1C, a line LN1B, and a smoothing capacitor C1. Chopper circuit 44-1 includes transistors Q1A, Q1B, diodes D1A, D1B and an inductor L1.

Positive bus LN1A has one end connected to transistor Q1B at the collector, and the other end connected to main positive bus MPL. Furthermore, negative bus LN1C has one end connected to negative polar line NL1 and the other end connected to main negative bus MNL.

Transistors Q1A, Q1B are connected in series between negative bus LN1C and positive bus LN1A. Diodes D1A, D1B are connected to transistors Q1A, Q1B, respectively, in anti-parallel. Inductor L1 is connected to a point connecting transistor Q1A and transistor Q1B together.

Line LN1B has one end connected to positive polar line PL1 and the other end connected to inductor L1. Smoothing capacitor C1 is connected between line LN1B and negative bus LN1C to reduce an AC component included in a DC voltage between line LN1B and negative bus LN1C.

For discharging power storage device 6-1, chopper circuit 44-1 operates in response to drive signal PWC1 received from converter ECU 2 (not shown) to upconvert DC power (driving electric power) received from positive polar line PL1 and negative polar line NL1, and for charging power storage device 6-1, chopper circuit 44-1 operates in response to the signal to downconvert DC power (regenerated electric power) received from main positive and negative buses MPL and MNL.

Figure 4:
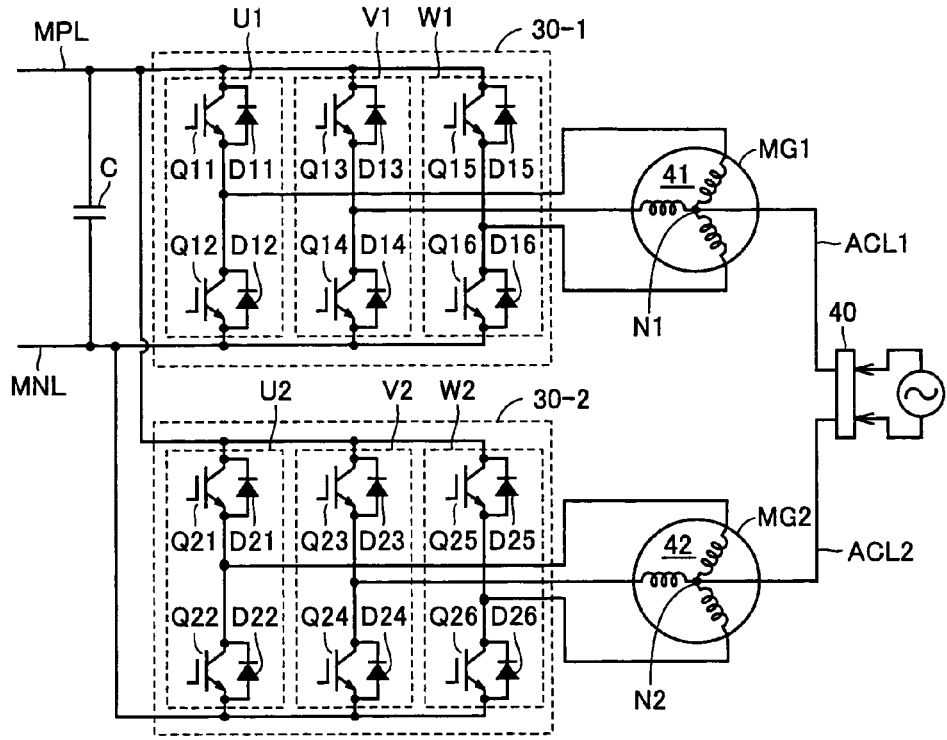
FIG. 4 generally shows a configuration of an inverter shown in FIG. 2.

FIG. 4 generally shows a configuration of inverters 30-1, 30-2 shown in FIG. 2. With reference to FIG. 4, inverter 30-1 includes a U phase arm U1, a V phase arm V1 and a W phase arm W1. U phase arm U1, V phase arm V1 and W phase arm W1 are connected between main positive bus MPL and main negative bus MNL in parallel. U phase arm U1 is formed of series connected transistors Q11, Q12. V phase arm V1 is formed of series connected transistors Q13, Q14. W phase arm W1 is formed of series connected transistors Q15, Q16. To transistors Q11-Q16, diodes D11-D16 are connected, respectively, in anti-parallel. U phase arm U1, V phase arm V1 and W phase arm W1 have their respective upper and lower arms connected at nodes, respectively, to which a 3 phase coil 41 of motor generator MG1 has U, V, W coils connected, respectively.

Inverter 30-2 includes a U phase arm U2, a V phase arm V2 and a W phase arm W2. Inverter 30-2 is similar in configuration to inverter 30-1 and accordingly will not be described in detail.

As has been described above, electric power input line ACL1 is connected to neutral point N1 of 3-phase coil 41 of motor generator MG1, and electric power input line ACL2 is connected to neutral point N2 of a 3-phase coil 42 of motor generator MG2.

Figure 5:
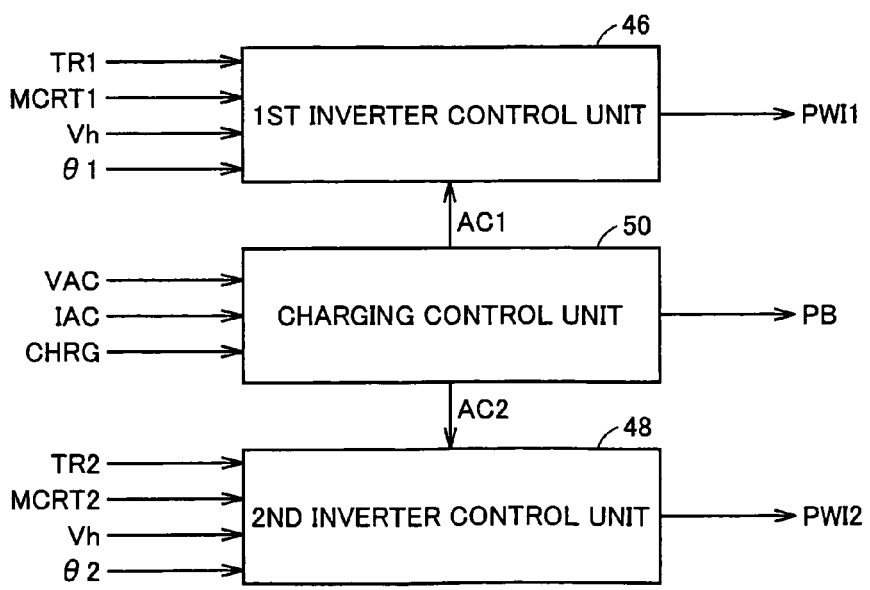
FIG. 5 is a functional block diagram of an inverter ECU shown in FIG. 2.

FIG. 5 is a functional block diagram of inverter ECU 32 shown in FIG. 2. With reference to FIG. 5, inverter ECU 32 includes a first inverter control unit 46, a second inverter control unit 48 and a charging control unit 50. First inverter control unit 46 receives target torque value TR1 for motor generator MG1, a motor current MCRT1 of motor generator MG1, a rotor angle θ1 of motor generator MG1, and voltage value Vh from voltage sensor 18 and generates signal PWI1 therefrom for driving motor generator MG1, and outputs the generated signal PWI1 to inverter 30-1. Note that motor current MCRT1 and rotor angle θ1 are each detected by a sensor (not shown).

Second inverter control unit 48 receives target torque value TR2 for motor generator MG2, a motor current MCRT2 of motor generator MG2, a rotor angle θ2 of motor generator MG2, and voltage value Vh and generates signal PWI2 therefrom for driving motor generator MG2, and outputs the generated signal PWI2 to inverter 30-2. Note that motor current MCRT2 and rotor angle θ2 are each detected by a sensor (not shown).

Herein, when power storage devices 6-1, 6-2 (FIG. 2) are charged from charging station 120 (FIG. 1), first and second inverter control units 46, 48 generate signals PWI1, PWI2 based on zero phase voltage control values AC1, AC2, respectively, received from charging control unit 50, and output the generated signals PWI1, PWI2 to inverters 30-1, 30-2, respectively.

When a flag CHRG indicating charging power storage devices 6-1, 6-2 externally from charging station 120 is set on, charging control unit 50 generates zero phase voltage control values AC1, AC2, as based on voltage VAC and current IAC received from AC port 38, for operating 3 phase coils 41, 42 and inverters 30-1, 30-2 as a single-phase PWM converter and outputs the generated zero phase voltage control values AC1, AC2 to first and second inverter control units 46, 48, respectively. Furthermore, charging control unit 50 outputs to converter ECU 2 a charging electric power control value PB (a negative value) indicating a target value for electric power charged from the charging station.

Figure 6:
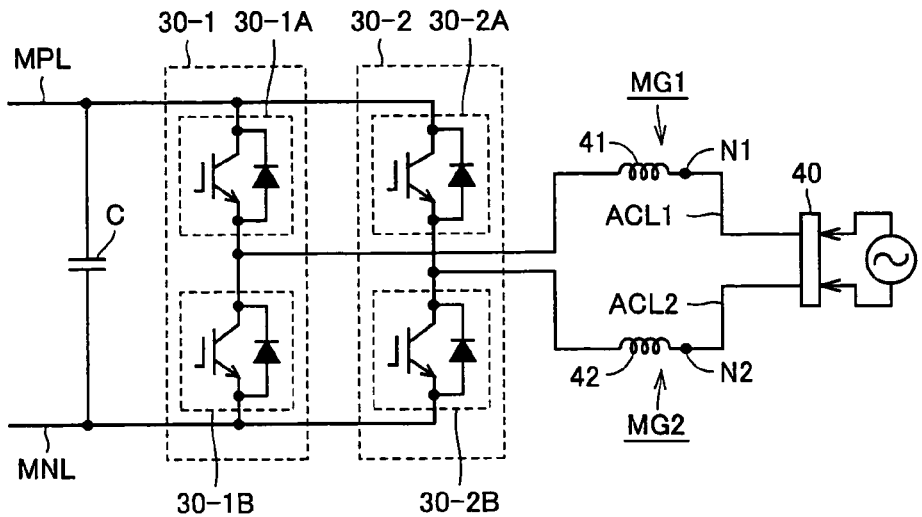
FIG. 6 shows a zero phase equivalent circuit of the FIG. 4 inverter and motor generator.

FIG. 6 shows a zero phase equivalent circuit of inverters 30-1, 30-2 and motor generators MG1, MG2 shown in FIG. 4. In each inverter 30-1, 30-2, each formed of a 3-phase bridge circuit, the six transistors have their on/off combinations in eight patterns. Of the eight switching patterns, two patterns allow an interphase voltage to be zero, and such a state of voltage is referred to as a zero voltage vector. For the zero voltage vector, the upper arms' three transistors can be regarded as being switched in mutually the same state (i.e., all on or off), and the lower arms' three transistors can also be regarded as being switched in mutually the same state. Accordingly in FIG. 6 the three transistors of the upper arms of inverter 30-1 are collectively shown as an upper arm 30-1A and the three transistors of the lower arms of inverter 30-1 are collectively shown as a lower arm 30-1B. Similarly, the three transistors of the upper arms of inverter 30-2 are collectively shown as an upper arm 30-2A and the three transistors of the lower arms of inverter 30-2 are collectively shown as a lower arm 30-2B.

As shown in FIG. 6, the zero phase equivalent circuit can be regarded as a single-phase PWM converter having an input of single phase AC power received at neutral points N1, N2 through electric power input lines ACL1, ACL2. Accordingly, varying a zero voltage vector in each of inverters 30-1, 30-2 and controlling inverters 30-1, 30-2 to operate as an arm of a single-phase PWM converter allow the AC power received from electric power input lines ACL1, ACL2 to be converted to DC power and output to main positive and negative buses MPL and MNL.

Figure 7:
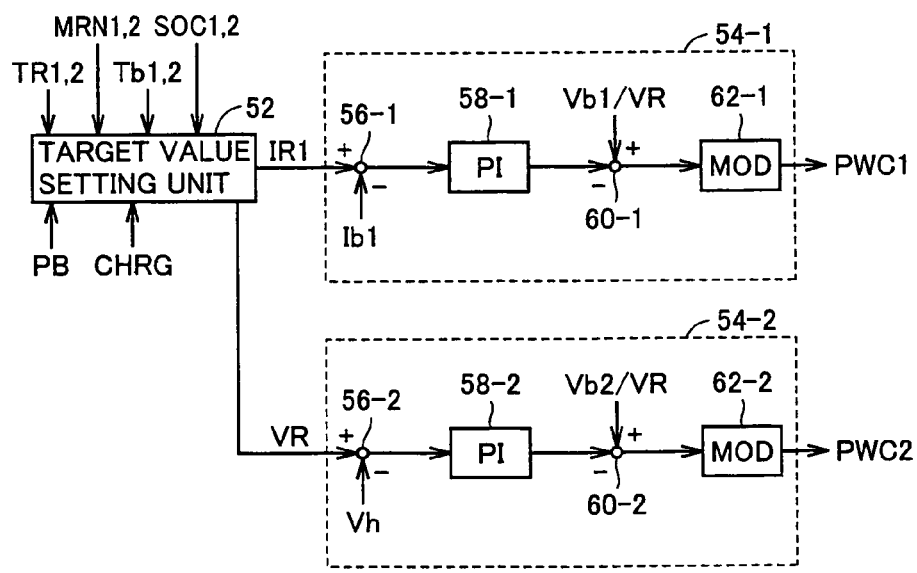
FIG. 7 is a functional block diagram of a converter ECU shown in FIG. 2.

FIG. 7 is a functional block diagram of converter ECU 2 shown in FIG. 2. With reference to FIG. 7, converter ECU 2 includes a target value setting unit 52, a current control unit 54-1, and a voltage control unit 54-2.

Current control unit 54-1 controls converter 8-1 in current, as based on a target current IR1 received from target value setting unit 52. Current control unit 54-1 includes subtraction units 56-1, 60-1, a PI control unit 58-1, and a modulation unit 62-1. Subtraction unit 56-1 subtracts current value Ib1 from target current IR1 and outputs the result of the calculation to PI control unit 58-1. PI control unit 58-1 performs a proportional-plus-integral operation based on the output of subtraction unit 56-1 and outputs the result of the calculation to subtraction unit 60-1. Subtraction unit 60-1 subtracts the output of PI control unit 58-1 from an inverse of a theoretical upconversion ratio of converter 8-1 indicated by voltage value Vb1/target voltage VR and outputs the result of the calculation to modulation unit 62-1. Note that subtraction unit 60-1 receives a term (i.e., voltage value Vb1/target voltage VR), which is a voltage feed forward (FF) compensation term based on the theoretical upconversion ratio of converter 8-1.

Modulation unit 62-1 generates a pulse width modulation (PWM) signal based on the output received from subtraction unit 60-1 and a carrier wave generated by an oscillation unit (not shown) and outputs the generated PWM signal to transistors Q1A, Q1B of converter 8-1 as drive signal PWC1.

Voltage control unit 54-2 controls converter 8-2 in voltage through feedback (FB) based on target voltage VR issued from target value setting unit 52. Voltage control unit 54-2 includes subtraction units 56-2, 60-2, a PI control unit 58-2, and a modulation unit 62-2. Subtraction unit 56-2 subtracts voltage value Vh from target voltage VR and outputs the result of the calculation to PI control unit 58-2. PI control unit 58-2 performs a proportional-plus-integral operation based on the output of subtraction unit 56-2 and outputs the result of the calculation to subtraction unit 60-2. Subtraction unit 60-2 subtracts the output of PI control unit 58-2 from an inverse of a theoretical upconversion ratio of converter 8-2 indicated by voltage value Vb2/target voltage VR and outputs the result of the calculation to modulation unit 62-2. Note that subtraction unit 60-2 receives a term (i.e., voltage value Vb2/target voltage VR), which is a voltage FF compensation term based on the theoretical upconversion ratio of converter 8-2.

Modulation unit 62-2 generates a PWM signal based on the output received from subtraction unit 60-2 and a carrier wave generated by an oscillation unit (not shown) and outputs the generated PWM signal to transistors Q2A, Q2B of converter 8-2 as drive signal PWC2.

When flag CHRG indicating external charging is set off, target value setting unit 52 generates target current IR1 and target voltage VR for current value Ib1 and voltage value Vh, respectively, as based on target torque values TR1, TR2 and target rotation speed values MRN1, MRN2, and outputs the generated target current IR1 and target voltage VR to current control unit 54-1 and voltage control unit 54-2, respectively.

Furthermore, when flag CHRG indicating external charging is set on, i.e., when power storage devices 6-1, 6-2 are charged from charging station 120, target value setting unit 52 generates target current IR1 and target voltage VR, as based on charging electric power control value PB indicating a target value for electric power charged from charging station 120, and outputs the generated target current IR1 and target voltage VR to current control unit 54-1 and voltage control unit 54-2, respectively.

Herein, target value setting unit 52 determines from temperatures Tb1, Tb2 of power storage devices 6-1, 6-2 whether to exert control to increase power storage devices 6-1, 6-2 in temperature, and in exerting control to do so, target value setting unit 52 generates target current IR1 and target voltage VR, as based on charging electric power control value PB, temperatures Tb1, Tb2 and amounts of states SOC1, SOC2, for charging power storage devices 6-1, 6-2 from charging station 120 while also allowing power storage devices 6-1 and 6-2 to communicate electric power therebetween and outputs the generated target current IR1 and target voltage VR to current control unit 54-1 and voltage control unit 54-2, respectively.

Figure 8:
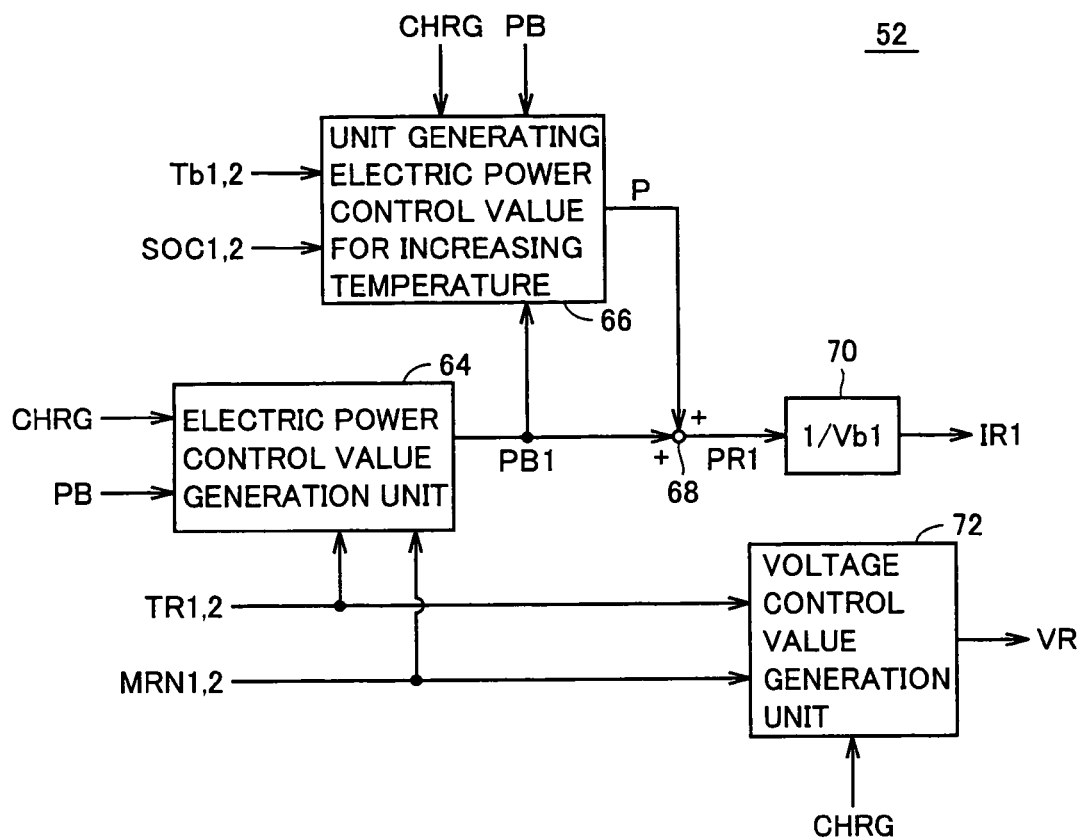
FIG. 8 is a functional block diagram of a target value setting unit shown in FIG. 7.

FIG. 8 is a functional block diagram of target value setting unit 52 shown in FIG. 7. With reference to FIG. 8, target value setting unit 52 includes an electric power control value generation unit 64, a unit 66 generating an electric power control value for increasing temperature, an addition unit 68, a division unit 70, and a voltage control value generation unit 72.

When flag CHRG indicating external charging is set off, electric power control value generation unit 64 calculates a vehicular required power based on target torque values TR1, TR2 and target rotation speed values MRN1, MRN2, and calculates an electric power control value PB1 based on the calculated vehicular required power and indicating a target value for an electric power that power storage device 6-1 bears.

Furthermore, when flag CHRG indicating external charging is set on, electric power control value generation unit 64 calculates electric power control value PB1 based on charging electric power control value PB and indicating a target value for an electric power charged from charging station 120 to power storage device 6-1.

When flag CHRG indicating external charging is set on and at least one of temperatures Tb1, Tb2 of power storage devices 6-1, 6-2 is lower than a defined value, unit 66 generating an electric power control value for increasing temperature generates an electric power control value P for increasing temperature. More specifically, electric power control value P is provided for allowing power storage devices 6-1, 6-2 to communicate electric power therebetween through converters 8-1, 8-2 and main positive and negative buses MPL and MNL for the purpose of increasing the power storage device (s) in temperature. Herein, as power storage devices 6-1, 6-2 are charged from charging station 120 while it is necessary to communicate electric power between power storage devices 6-1, 6-2, unit 66 generating an electric power control value for increasing temperature generates electric power control value P, as based on a charging electric power control value, to allow a power storage device of power storage devices 6-1, 6-2 communicating electric power therebetween that serves as an electric power receiving side to receive its allowable input electric power to increase temperature.

Addition unit 68 adds together electric power control value PB1 received from electric power control value generation unit 64 and electric power control value P for increasing temperature received from unit 66 generating an electric power control value for increasing temperature and outputs the result of the calculation as an electric power control value PR1 issued for converter 8-1 (a current control system), and division unit 70 divides electric power control value PR1 received from addition unit 68 by voltage value Vb1 and outputs the result of the calculation as target current IR1 of current control unit 54-1.

In contrast, when flag CHRG indicating external charging is set off, unit 66 generating an electric power control value for increasing temperature sets electric power control value P for increasing temperature at zero. Note that also generating electric power control value P for increasing temperature when flag CHRG indicating external charging is set off allows also exerting control to increase a power storage device in temperature when charging station 120 does not charge.

When flag CHRG indicating external charging is set off, voltage control value generation unit 72 generates target voltage VR based on target torque values TR1, TR2 and target rotation speed values MRN1, MRN2 and indicating a target value for voltage value Vh. When flag CHRG indicating external charging is set on, voltage control value generation unit 72 outputs a preset defined value as target voltage VR.

Figure 9:
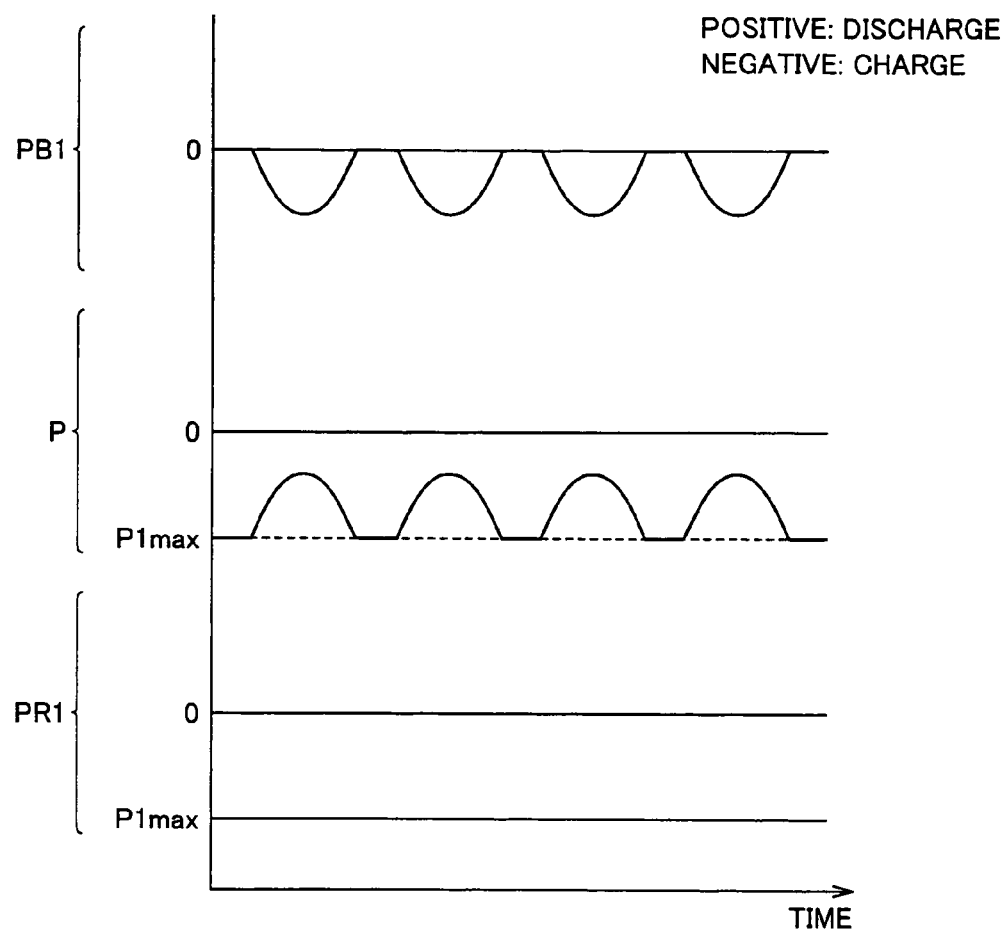
FIG. 9 is a first diagram indicating an electric power control value for a converter in charging a power storage device from a charging station when exerting control to increase the temperature of the power storage device.
Figure 10:
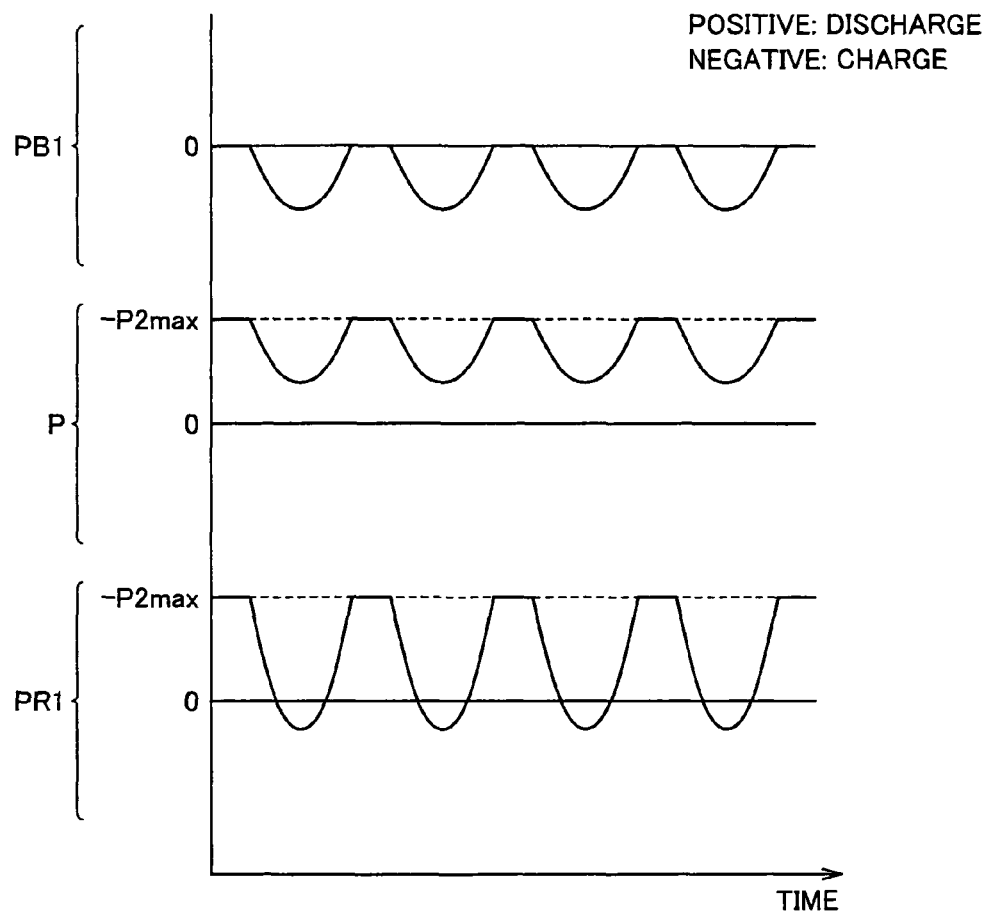
FIG. 10 is a second diagram indicating an electric power control value for a converter in charging a power storage device from a charging station when exerting control to increase the temperature of the power storage device.

FIGS. 9 and 10 represent an electric power control value issued for converter 8-1 in charging power storage devices 6-1, 6-2 from charging station 120 when exerting control to increase power storage devices 6-1, 6-2 in temperature. FIG. 9 indicates an electric power control value applied when power storage device 6-1 corresponding to converter 8-1 (current control) serves as an electric power receiving side, and FIG. 10 indicates an electric power control value applied when power storage device 6-1 serves as an electric power feeding side.

With reference to FIG. 9, electric power control value PB1 indicating a target value for electric power charged from charging station 120 to power storage device 6-1 varies with AC power input, and unit 66 generating an electric power control value for increasing temperature (FIG. 8) generates electric power control value P, as based on this charging electric power control value, for increasing temperature. More specifically, unit 66 generating an electric power control value for increasing temperature generates an allowable input electric power P1max of the electric power receiving side or power storage device 6-1 minus electric power control value PB1 as electric power control value P for increasing temperature.

Then, electric power control value PR1 issued for converter 8-1 is electric power control value PB1 plus electric power control value P for increasing temperature. Accordingly, it will be allowable input electric power P1max of power storage device 6-1. In other words, unit 66 generating an electric power control value for increasing temperature generates electric power control value P based on charging electric power control value (PB1) to allow the electric power receiving side or power storage device 6-1 to receive a maximal electric power from power storage device 6-2 within a range of electric power receivable by power storage device 6-1 to increase temperature. Power storage devices 6-1, 6-2 can thus be rapidly increased in temperature.

Note that allowable input electric power P1max can be determined for example from amount of state SOC1 and temperature Tb1 with reference to a table setting a defined value for each SOC and temperature of power storage device 6-1. Alternatively, such an electric power input to power storage device 6-1 that voltage value Vb1 of power storage device 6-1 is an upper limit value may be calculated and used as allowable input electric power P1max.

In contrast, with reference to FIG. 10, when power storage device 6-1 is an electric power feeding side, unit 66 generating an electric power control value for increasing temperature generates an allowable input electric power P2max of the electric power receiving side or power storage device 6-2 minus an electric power (PB−PB1) charged to power storage device 6-2, that is inverted in sign, as electric power control value P for increasing temperature.

Then the electric power receiving side or power storage device 6-2 receives the electric power (PB−PB1) charged to power storage device 6-2 plus that indicated by a value (−P), i.e., that corresponding to allowable input electric power P2max.

Note that electric power control value PR1 issued for converter 8-1 is electric power control value PB1 plus electric power control value P for increasing temperature. Accordingly, it will be allowable input electric power P2max inverted in sign minus charging electric power control value PB.

In other words, unit 66 generating an electric power control value for increasing temperature generates electric power control value P based on charging electric power control values (PB, PB1) to allow the electric power receiving side or power storage device 6-2 to receive a maximal electric power from power storage device 6-1 in a range of electric power receivable by power storage device 6-2 to increase temperature. Power storage devices 6-1, 6-2 can thus be rapidly increased in temperature.

Note that as well as allowable input electric power P1max, allowable input electric power P2max may also be determined by employing a table setting a defined value for each SOC and temperature of power storage device 6-2, or such an electric power input to power storage device 6-2 that voltage value Vb2 of power storage device 6-2 is an upper limit value may be calculated and used as allowable input electric power P2max.

Figure 11:
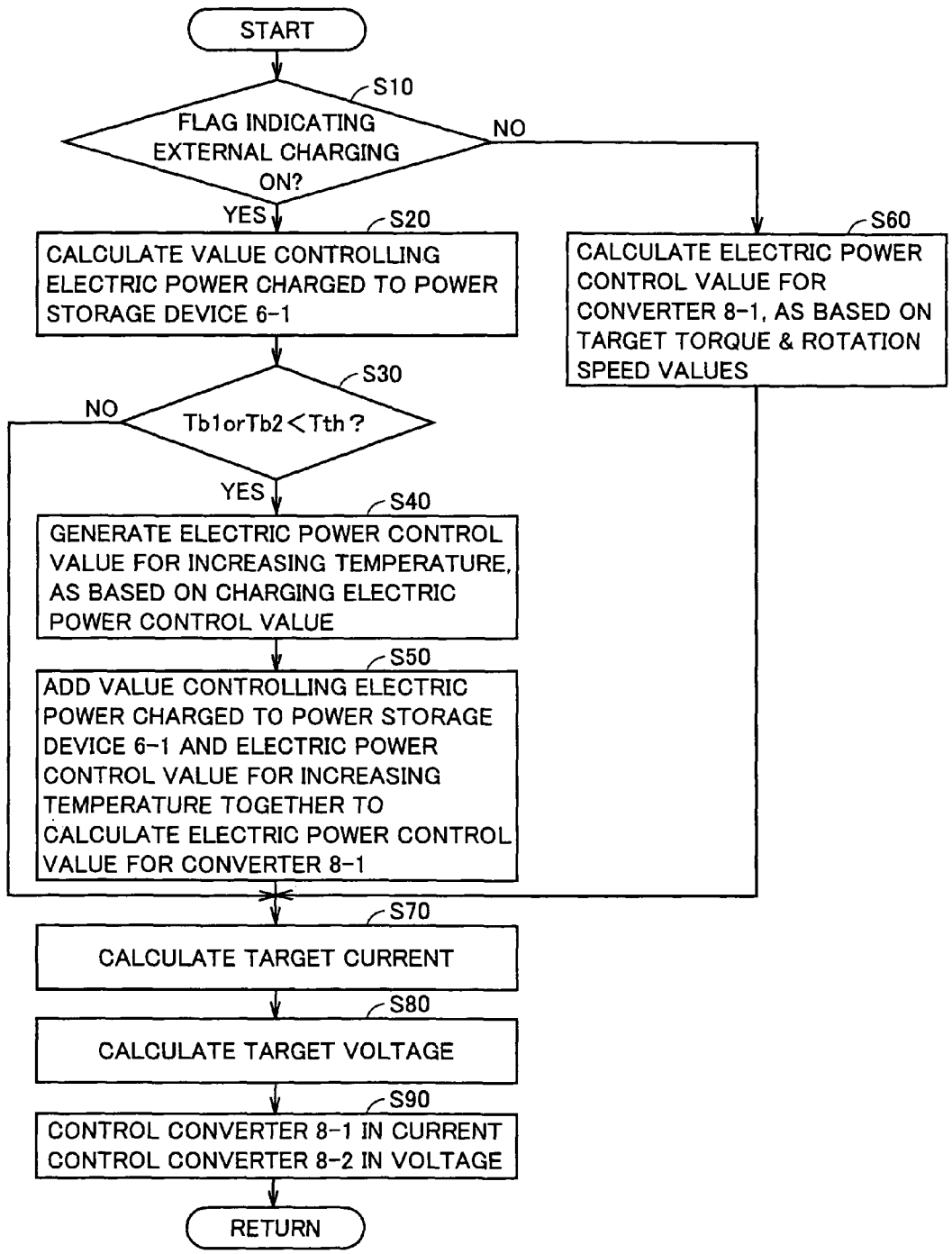
FIG. 11 is a flowchart representing a structure of the FIG. 2 converter ECU for control.

FIG. 11 is a flowchart representing a structure of the FIG. 2 converter ECU 2 for control. This flowchart indicates a process invoked from a main routine and executed for each fixed period of time or when a predetermined condition is established.

With reference to FIG. 11, converter ECU 2 determines whether flag CHRG indicating external charging is set on (step S10). If flag CHRG indicating external charging is set on (YES at step S10), converter ECU 2 calculates value (PB1) controlling electric power charged to power storage device 6-1, as based on charging electric power control value PB indicating a target value for electric power charged from charging station 120 (step S20).

Then, converter ECU 2 determines whether a power storage device's temperature Tb1 or Tb2 is lower than a preset threshold temperature Tth (e.g., −10° C.) (step S30). If converter ECU 2 determines that temperatures Tb1, Tb2 are both at least threshold temperature Tth (NO at step S30), converter ECU 2 proceeds to step S70.

If at step S30 a decision is made that temperature Tb1 or Tb2 is lower than threshold temperature Tth (YES at step S30), then, to exert control to increase power storage device 6-1, 6-2 in temperature, converter ECU 2 generates electric power control value P, as based on charging electric power control values (PB, PB1), for increasing temperature (step S40). More specifically, converter ECU 2 for example determines one of the power storage devices having amounts of states SOC1, SOC2, respectively, that has a smaller amount of state as an electric power receiving side to be controlled to increase in temperature, and converter ECU 2 calculates electric power control value P for increasing temperature in accordance with the following equations:

$$P = P1max - PB1 \text{ if power storage device 6-1 is an electric power receiving side; and}$$

$$P = -(P2max - (PB - PB1)) \text{ if power storage device 6-2 is an electric power receiving side.}$$

Then, converter ECU 2 adds value (PB1) controlling electric power charged to power storage device 6-1 and electric power control value P for increasing temperature together to calculate electric power control value PR1 issued for converter 8-1 (the current control system) (step S50).

Once electric power control value PR1 has been calculated, converter ECU 2 divides electric power control value PR1 by voltage value Vb1 of power storage device 6-1 to calculate target current IR1 (step S70). Furthermore, converter ECU 2 calculates target voltage VR (step S80), and converter ECU 2 controls converter 8-1 in current, as based on target current IR1, and controls converter 8-2 in voltage, as based on target voltage VR (step S90).

In contrast, if at step S10 flag CHRG indicating external charging is set off (NO at step S10), converter ECU 2 calculates electric power control value PR1 issued for converter 8-1 (the current control system), as based on target torque values TR1, TR2 and target rotation speed values MRN1, MRN2 (step S60), and converter ECU 2 proceeds to step S70.

Thus, in the first embodiment, in charging power storage devices 6-1, 6-2 from charging station 120 if power storage devices 6-1, 6-2 are low in temperature, power storage devices 6-1 and 6-2 communicate electric power therebetween to be increased in temperature, as controlled. Thus in the first embodiment once charging power storage devices 6-1, 6-2 has started power storage devices 6-1, 6-2 can have a rapidly increasing charging characteristic and thus be charged in a short period of time.

Furthermore in the first embodiment converter ECU 2 in exerting control to increase temperature determines electric power communicated between power storage devices 6-1 and 6-2, as based on electric power charged from charging station 120, to allow a power storage device serving as an electric power receiving side to receive a maximal allowable input electric power. Thus in the first embodiment power storage devices 6-1, 6-2 can be increased in temperature in a minimum period of time.

Second Embodiment

A second embodiment indicates a configuration allowing converters 8-1, 8-2 to be both controlled in current. The second embodiment provides a motored vehicle generally having a configuration identical to that of motored vehicle 100 shown in FIG. 2.

Figure 12:
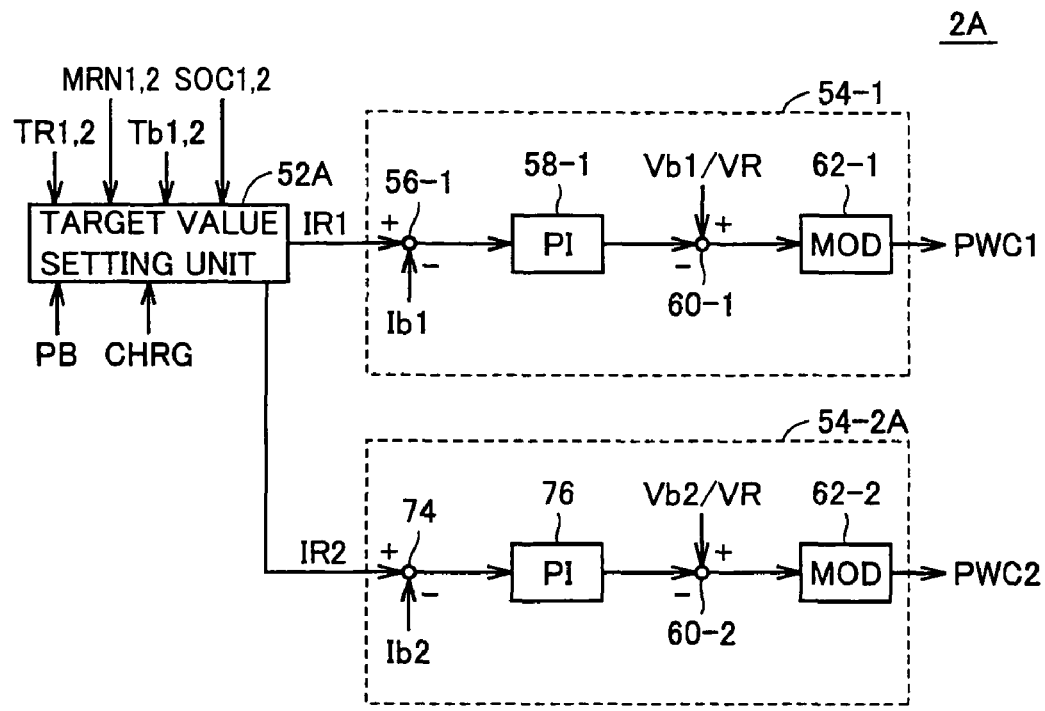
FIG. 12 is a functional block diagram of a converter ECU in a second embodiment.

FIG. 12 is a functional block diagram of a converter ECU 2A in the second embodiment. With reference to FIG. 12, converter ECU 2A includes a target value setting unit 52A and current control units 54-1, 54-2A.

Current control unit 54-2A controls converter 8-2 in current, as based on a target current IR2 received from target value setting unit 52A. Current control unit 54-2A includes subtraction units 74, 60-2, a PI control unit 76, and modulation unit 62-2. Subtraction unit 74 subtracts current value Ib2 from target current IR2 and outputs the result of the calculation to PI control unit 76. PI control unit 76 performs a proportional-plus-integral operation based on the output of subtraction unit 74 and outputs the result of the calculation to subtraction unit 60-2. Note that subtraction unit 60-2 and modulation unit 62-2 are as has been described with reference to FIG. 7.

When flag CHRG indicating external charging is set off, target value setting unit 52A generates target currents IR1, IR2 for current values Ib1, Ib2, respectively, as based on target torque values TR1, TR2 and target rotation speed values MRN1, MRN2, and outputs the generated target currents IR1, IR2 to current control unit 54-1, 54-2A, respectively.

Furthermore, when flag CHRG indicating external charging is set on, i.e., when power storage devices 6-1, 6-2 are charged from charging station 120, target value setting unit 52A generates target currents IR1, IR2 based on charging electric power control value PB and outputs the generated target currents IR1, IR2 to current control unit 54-1, 54-2A, respectively.

Herein, target value setting unit 52A determines as based on temperatures Tb1, Tb2 whether to exert control to increase a power storage device in temperature, and in exerting control to do so, target value setting unit 52A generates target currents IR1, IR2, as based on charging electric power control value PB, temperatures Tb1, Tb2 and amounts of states SOC1, SOC2, for charging power storage devices 6-1, 6-2 from charging station 120 and therewhile also allowing power storage devices 6-1 and 6-2 to communicate electric power therebetween, and outputs the generated target currents IR1, IR2 to current control unit 54-1, 54-2A, respectively.

Figure 13:
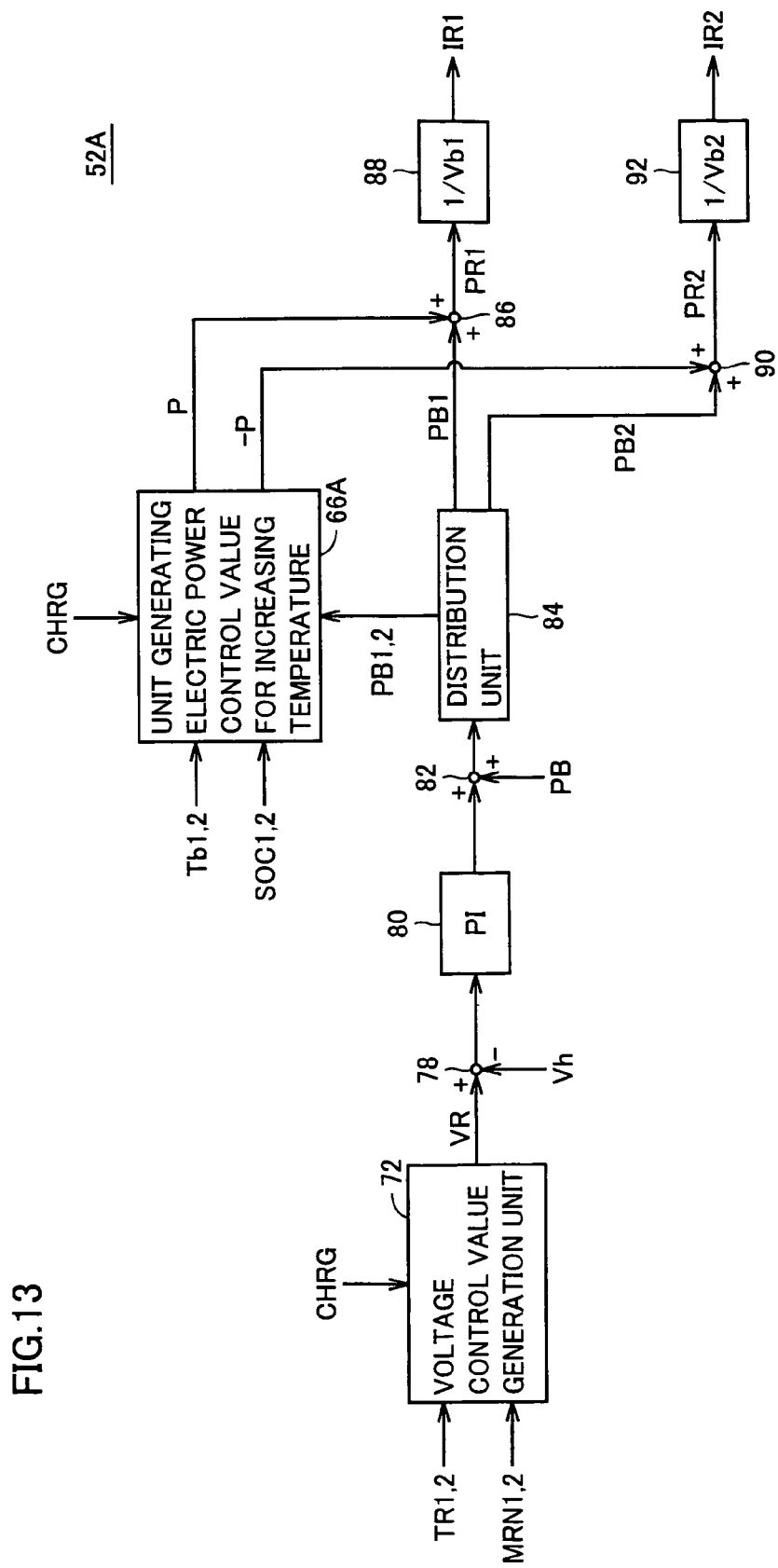
FIG. 13 is a functional block diagram of a target value setting unit shown in FIG. 12.

FIG. 13 is a functional block diagram of target value setting unit 52A shown in FIG. 12. With reference to FIG. 13, target value setting unit 52A includes voltage control value generation unit 72, a subtraction unit 78, a PI control unit 80, addition units 82, 86, 90, a distribution unit 84, a unit 66A generating an electric power control value for increasing temperature, and division units 88, 92.

Voltage control value generation unit 72 generates target voltage VR indicating a target value for voltage value Vh between main positive and negative buses MPL and MNL. Voltage control value generation unit 72 is as has been described with reference to FIG. 8.

Subtraction unit 78 subtracts voltage value Vh from target voltage VR and outputs the result of the calculation to PI control unit 80. PI control unit 80 performs a proportional-plus-integral operation based on the output of subtraction unit 78 and outputs the result of the calculation to addition unit 82. Addition unit 80 adds charging electric power control value PB indicating a target value for electric power charged from the charging station and the output of PI control unit 80 together and outputs the result of the calculation to distribution unit 84.

Distribution unit 84 follows a predetermined distribution ratio α (0≦α≦1) to distribute the output of addition unit 82 to electric power control value PB1 and an electric power control value PB2 issued for converter 8-1 and converter 8-2, respectively, and outputs electric power control values PB1, PB2 to addition units 86, 90, respectively. It should be noted that for example when the vehicle is traveling, distribution ratio α can be determined based on power that motor generators MG1, MG2 are required to output, and when charging station 120 charges, the ratio can be determined based on the SOCs of power storage devices 6-1, 6-2.

When flag CHRG indicating external charging is set on and at least one of temperatures Tb1, Tb2 of power storage devices 6-1, 6-2 is lower than a defined value, unit 66A generating an electric power control value for increasing temperature generates electric power control value P for increasing temperature. Herein, unit 66A generating an electric power control value for increasing temperature generates electric power control value P, as based on charging electric power control values (PB1, PB2), to allow a power storage device of power storage devices 6-1, 6-2 communicating electric power therebetween that serves as an electric power receiving side to receive its allowable input electric power to increase temperature, and unit 66A generating an electric power control value for increasing temperature outputs to addition unit 86 the generated electric power control value P for increasing temperature and also outputs to addition unit 90 electric power control value P that is inverted in sign, i.e., control value (−P), for increasing temperature.

Addition unit 86 adds together electric power control value PB1 received from distribution unit 84 and electric power control value P for increasing temperature received from unit 66A generating an electric power control value for increasing temperature and outputs the result of the calculation as electric power control value PR1 issued for converter 8-1. Furthermore, addition unit 90 adds together electric power control value PB2 received from distribution unit 84 and control value (−P) received from unit 66A generating an electric power control value for increasing temperature and outputs the result of the calculation as an electric power control value PR2 issued for converter 8-2.

Division unit 88 receives electric power control value PR1 from addition unit 86, divides the value by voltage value Vb1 and outputs the result of the calculation as target current IR1 of current control unit 54-1. Furthermore, division unit 92 receives electric power control value PR2 from addition unit 90, divides the value by voltage value Vb2 and outputs the result of the calculation as target current IR2 of current control unit 54-2A.

Figure 14:
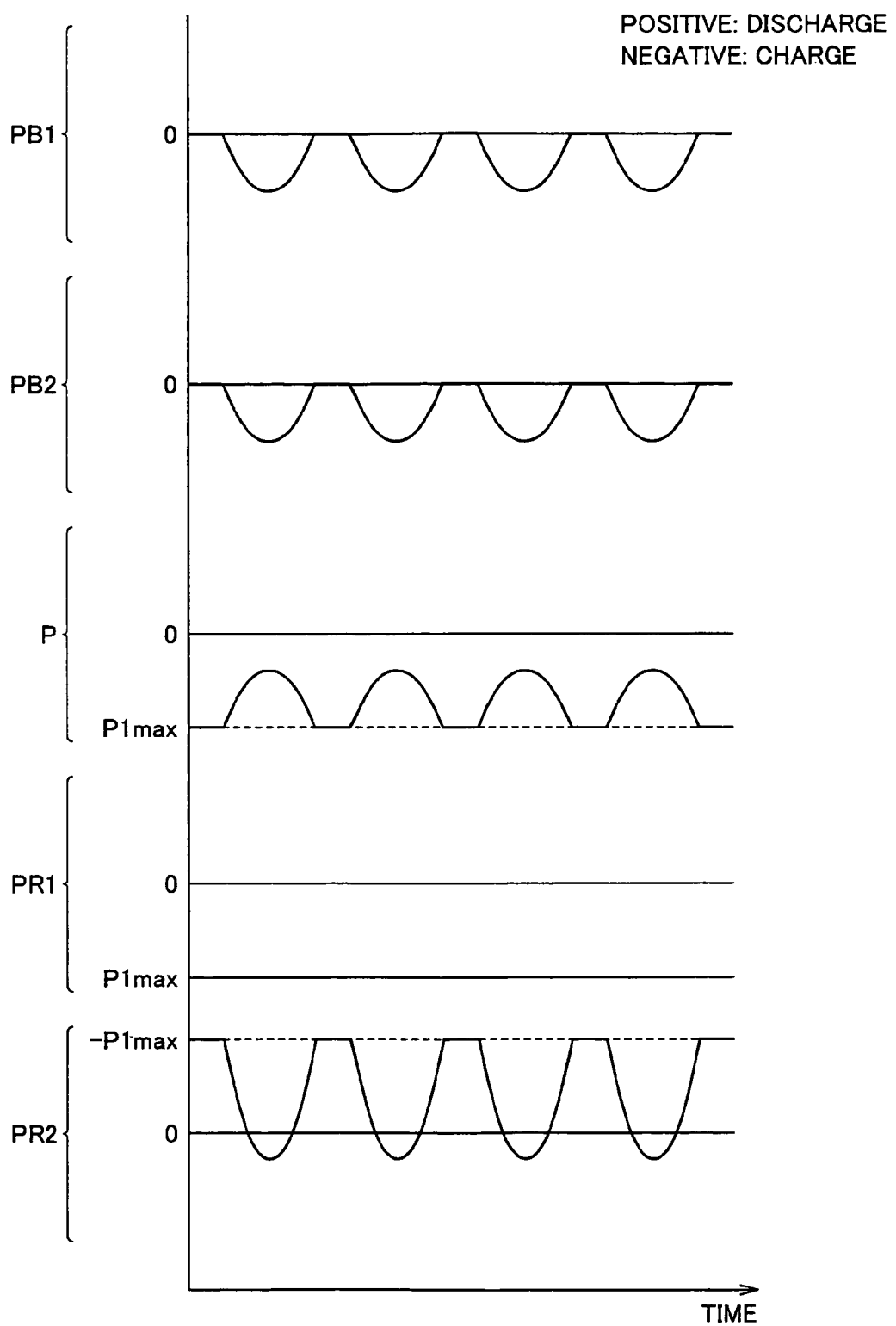
FIG. 14 is a diagram indicating an electric power control value for a converter in charging a power storage device from a charging station when exerting control to increase the temperature of the power storage device in the second embodiment.

FIG. 14 is a diagram indicating an electric power control value issued for a converter in charging power storage devices 6-1, 6-2 from charging station 120 when exerting control to increase power storage devices 6-1, 6-2 in temperature in the second embodiment. In the following description, in exerting control to increase temperature, power storage device 6-1 serves as an electric power receiving side. However, the following description can similarly be applied to exerting control to increase temperature with power storage device 6-2 serving as an electric power receiving side.

With reference to FIG. 14, electric power control values PB1, PB2 indicating target values for electric power charged from charging station 120 to power storage devices 6-1, 6-2 vary with AC power input, and unit 66A generating an electric power control value for increasing temperature (FIG. 13) generates electric power control value P for increasing temperature, as based on charging electric power control value (PB1) corresponding to power storage device 6-1 serving as an electric power receiving side. More specifically, unit 66A generating an electric power control value for increasing temperature generates allowable input electric power P1max of the electric power receiving side or power storage device 6-1 minus electric power control value PB1 as electric power control value P for increasing temperature.

Then, electric power control value PR1 issued for converter 8-1 is electric power control value PB1 plus electric power control value P for increasing temperature. Accordingly, it will be allowable input electric power P1max of power storage device 6-1. On the other hand, electric power control value PR2 issued for converter 8-2 is electric power control value PB2 (=PB−PB1) plus control value (−P). Accordingly, it will be −P1max+PB.

Thus, unit 66A generating an electric power control value for increasing temperature generates electric power control values P, −P, as based on charging electric power control value (PB1), to allow the electric power receiving side or power storage device 6-1 to receive a maximal electric power from power storage device 6-2 in a range of electric power receivable by power storage device 6-1 to increase temperature. Power storage devices 6-1, 6-2 can thus be rapidly increased in temperature.

It should be noted that in exerting control to increase temperature, which one of power storage devices 6-1, 6-2 having amounts of states SOC1, SOC2, respectively, should be an electric power receiving side can simply be determined by which power storage device has a smaller SOC.

Figure 15:
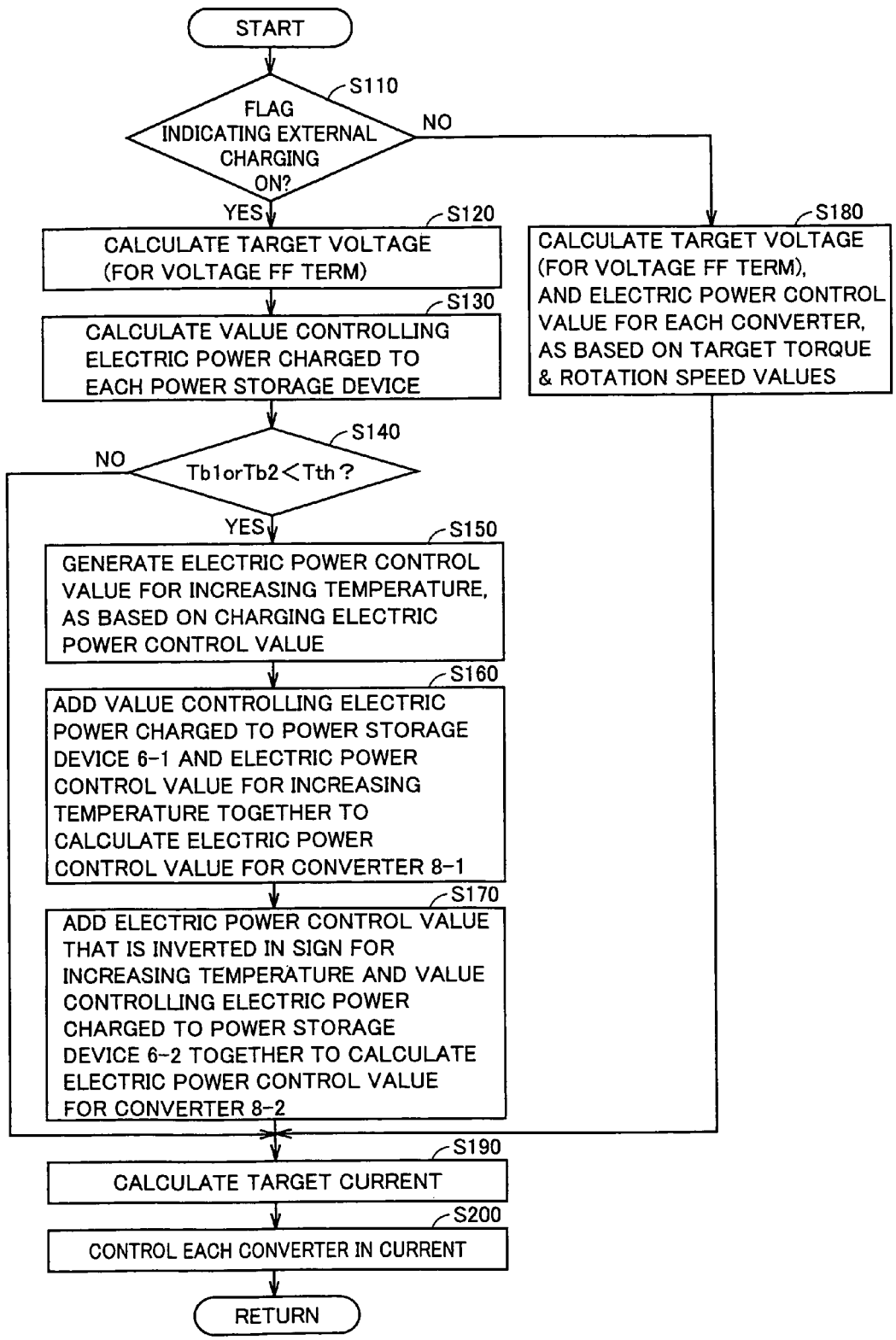
FIG. 15 is a flowchart representing a structure of the converter ECU for control in the second embodiment.

FIG. 15 is a flowchart representing a structure of converter ECU 2A for control in the second embodiment. This flowchart also indicates a process invoked from a main routine and executed for each fixed period of time or when a predetermined condition is established With reference to FIG. 15, converter ECU 2A determines whether flag CHRG indicating external charging is set on (step S110). If so (YES at step S110), converter ECU 2A calculates target voltage VR (for a voltage FF term) (step S120). Furthermore, converter ECU 2A calculates values (PB1, PB2) controlling electric power charged to power storage devices 6-1, 6-2, as based on charging electric power control value PB indicating a target value for electric power charged from charging station 120 and distribution ratio α (step S130).

Then, converter ECU 2A determines whether a power storage device's temperature Tb1 or Tb2 is lower than preset threshold temperature Tth (step S140). If converter ECU 2A determines that temperatures Tb1, Tb2 are both at least threshold temperature Tth (NO at step S140), converter ECU 2A proceeds to step S190.

If at step S140 a decision is made that temperature Tb1 or Tb2 is lower than threshold temperature Tth (YES at step S140), then, to exert control to increase power storage device 6-1, 6-2 in temperature, converter ECU 2 generates electric power control value P, as based on charging electric power control values (PB1, PB2), for increasing temperature (step S150). More specifically, converter ECU 2 for example determines one of the power storage devices having amounts of states SOC1, SOC2, respectively, that has a smaller amount of state as an electric power receiving side to be controlled to increase in temperature, and converter ECU 2 calculates electric power control value P for increasing temperature in accordance with the following equations:

$P = P1max - PB1$ if power storage device 6-1 is an electric power receiving side; and $P = -(P2max - PB2)$ if power storage device 6-2 is an electric power receiving side.

Then, converter ECU 2 adds value (PB1) controlling electric power charged to power storage device 6-1 and electric power control value P for increasing temperature together to calculate electric power control value PR1 issued for converter 8-1 (step S160). Furthermore, converter ECU 2A adds value (PB2) controlling electric power charged to power storage device 6-2 and electric power control value P that is inverted in sign, i.e., control value (−P), for increasing temperature together to calculate electric power control value PR2 issued for converter 8-2 (step S170).

Once electric power control values PR1, PR2 have been calculated, converter ECU 2A divides electric power control value PR1 by voltage value Vb1 of power storage device 6-1 to calculate target current IR1 and divides electric power control value PR2 by voltage value Vb2 of power storage device 6-2 to calculate target current IR2 (step S190), and converter ECU 2A controls converters 8-1, 8-2 in current, as based on target currents IR1, IR2, respectively (step S200).

In contrast, if at step S110 flag CHRG indicating external charging is set off (NO at step S110), converter ECU 2A calculates target voltage VR (for a voltage FF term) and electric power control values RR1, PR2 issued for converters 8-1, 8-2, as based on target torque values TR1, TR2 and target rotation speed values MRN1, MRN2 (step S180) and converter ECU 2A proceeds to step S190.

The second embodiment allowing converters 8-1 and 8-2 to be both controlled in current can thus also be as effective as the first embodiment.

Third Embodiment

Figure 16:
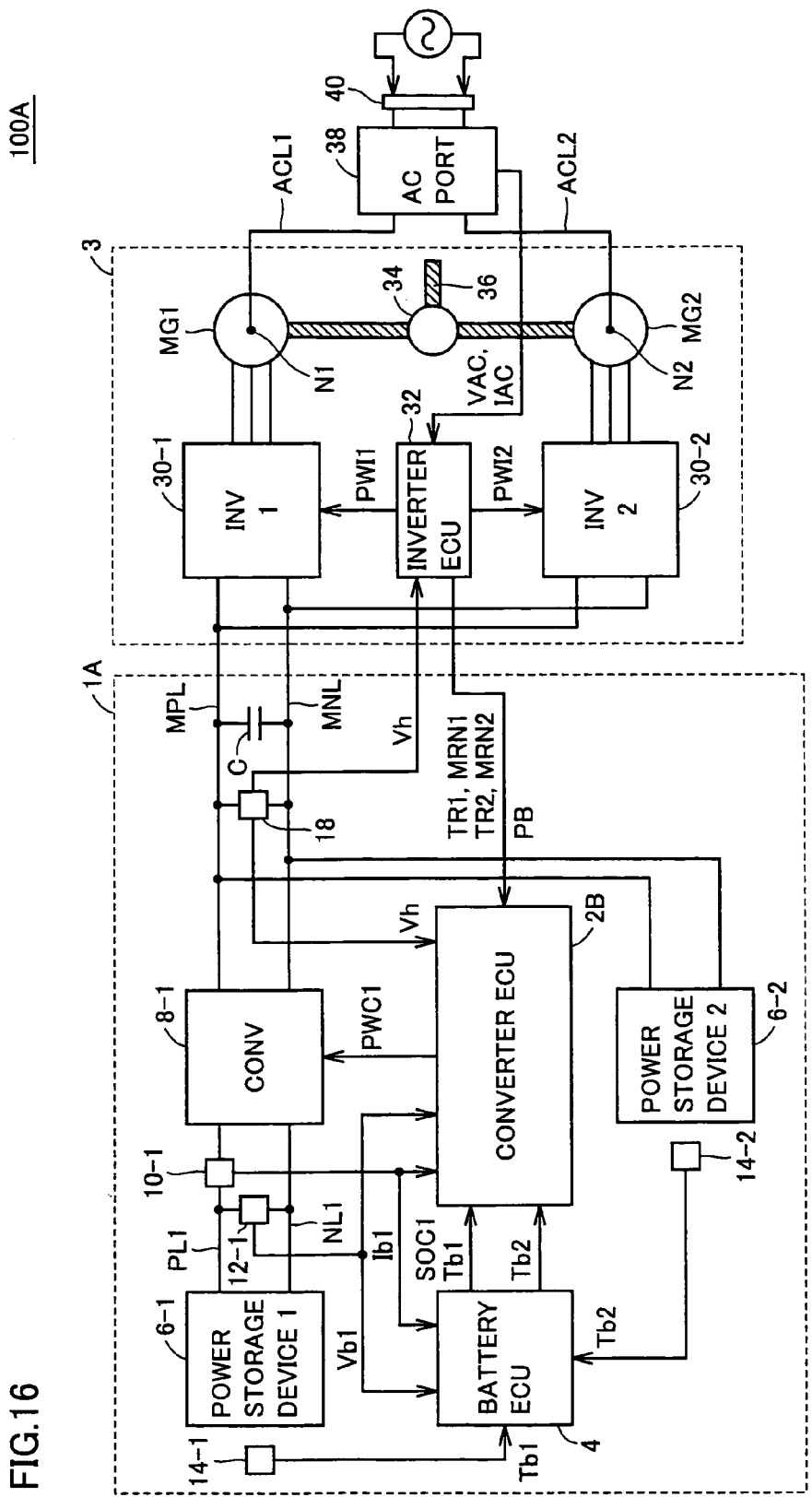
FIG. 16 is a general block diagram of a motored vehicle in a third embodiment.

FIG. 16 is a block diagram generally showing a motored vehicle in a third embodiment. With reference to FIG. 16, a motored vehicle 100A has the configuration of motored vehicle 100 of the first embodiment shown in FIG. 2 having power supply system 1 replaced with a power supply system 1A. Power supply system 1A corresponds in configuration to power supply system 1 excluding converter 8-2, current sensor 10-2 and voltage sensor 12-2 and having converter ECU 2 replaced with a converter ECU 2B. In other words, power storage device 6-2 is connected directly to main positive and negative buses MPL and MNL. Note that the remainder in configuration of motored vehicle 100A is identical to that of motored vehicle 100.

Figure 17:
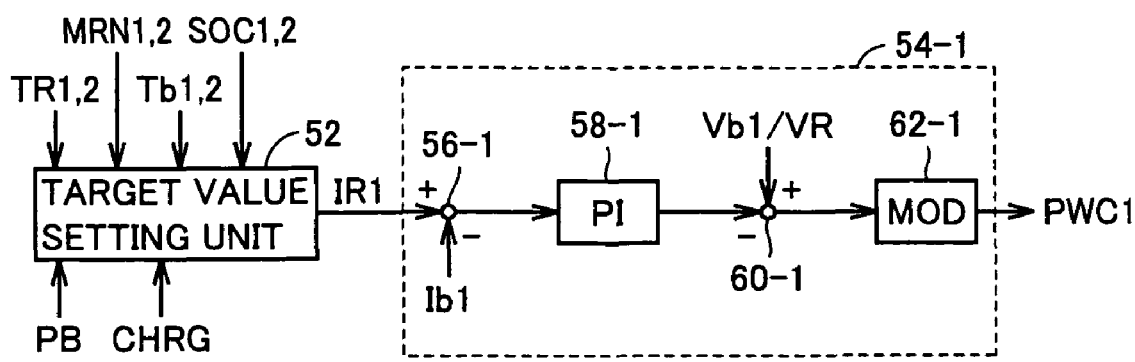
FIG. 17 is a functional block diagram of a converter ECU shown in FIG. 16.

FIG. 17 is a functional block diagram of converter ECU 2B shown in FIG. 16. With reference to FIG. 17, converter ECU 2B is identical in configuration to converter ECU 2 shown in FIG. 7 except that voltage control unit 54-2 is excluded.

As well as the first embodiment, the third embodiment also has converter 8-1 controlled (a current is controlled), and in charging power storage devices 6-1, 6-2 from charging station 120 if a power storage device has low temperature the power storage devices communicate electric power therebetween to increase the power storage device in temperature, as controlled. The third embodiment can thus also be as effective as the first embodiment.

Furthermore, the third embodiment has a smaller number of converters than the first embodiment and can accordingly reduce the cost for the motored vehicle.

While in the above embodiments AC power received from a charging station is received by motor generators MG1, MG2 at neutral points N1, N2 and converted through motor generators MG1, MG2 and inverters 30-1, 30-2 to DC power and thus output to power supply system 1. Alternatively, the AC power received from the charging station may be input through a separately provided converter dedicated to charging.

Figure 18:
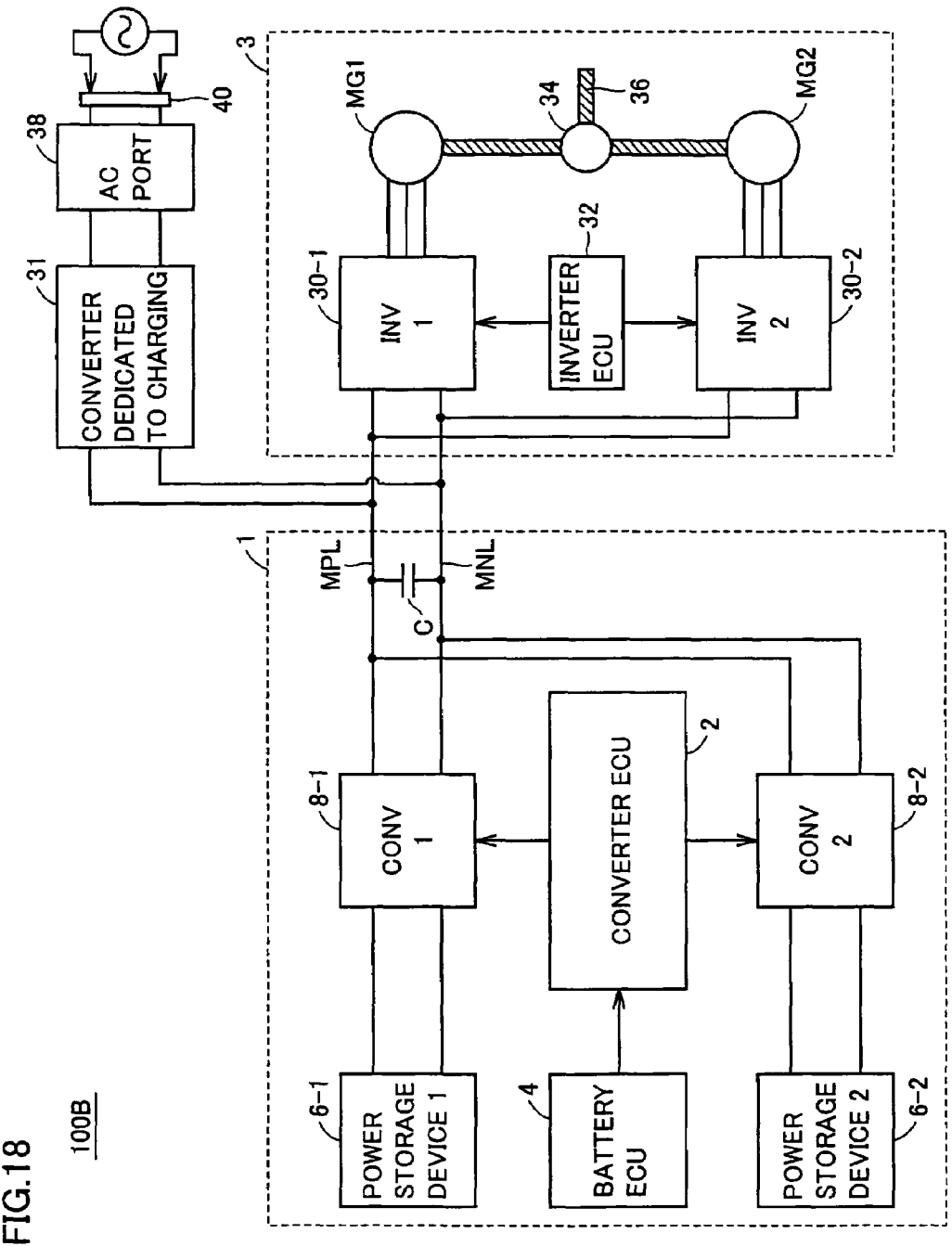
FIG. 18 is a general block diagram of a motored vehicle provided with a converter dedicated to charging.

FIG. 18 is a block diagram generally showing a motored vehicle provided with a converter dedicated to charging. With reference to FIG. 18, a motored vehicle 100B has the configuration of motored vehicle 100 of the first embodiment shown in FIG. 2 excluding electric power input lines ACL1, ACL2 connected to neutral points N1, N2, respectively, and further including a converter 31 dedicated to charging.

Converter 31 dedicated to charging is disposed between AC port 38 and main positive and negative buses MPL and MNL. Converter 31 dedicated to charging receives AC power from connector 40, converts the received AC power to DC power, and outputs the DC power to main positive and negative buses MPL and MNL.

Note that although not particularly shown, the motored vehicle of the second embodiment and motored vehicle 100A of the third embodiment shown in FIG. 17 may be configured to exclude electric power input lines ACL1, ACL2 connected to neutral points N1, N2, respectively, and include converter 31 dedicated to charging.

While the above embodiments have been described with power supply system 1, 1A including two power storage devices 6-1 and 6-2, the power supply system may include more power storage devices. In that case, two power storage devices at least one of which has a converter can be selected and the above described method can be employed to implement exerting control to increase temperature in charging externally.

Furthermore in the above description converter ECU 2 (2A, 2B) and inverter ECU 32 are configured by separate ECUs. Alternatively, converter ECU 2 (2A, 2B) and inverter ECU 32 may be configured by a single ECU.

It should be noted that in the above description motor generator MG2 corresponds to a "motor" in the present invention and electric power input lines ACL1, ACL2, AC port 38 and connector 40 form an "electric power receiving unit" in the present invention. Furthermore, inverters 30-1, 30-2 and converters 8-1, 8-2 form a "voltage conversion device" in the present invention and converter ECU 2, 2A, 2B corresponds to a "control device" in the present invention.

Furthermore, main positive and negative buses MPL and MNL correspond to an "electric power line" in the present invention and motor generators MG1, MG2 correspond to a "first AC rotating electric machine" and a "second AC rotating electric machine", respectively, in the present invention. Furthermore, inverter ECU 32 corresponds to an "inverter control unit" in the present invention.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

The invention claimed is:

1. A motored vehicle comprising:
a plurality of chargeable power storage devices;
a motor using electric power received from said plurality of power storage devices to generate driving power for the vehicle;
an electric power receiving unit receiving electric power from a power supply external to the vehicle for charging said plurality of power storage devices;
a voltage conversion device connected to said electric power receiving unit and said plurality of power storage devices, and configured to convert in voltage the electric power that said electric power receiving unit receives and output the converted electric power to said plurality of power storage devices, and also allow said plurality of power storage devices to communicate electric power therebetween; and
a control device controlling said voltage conversion device to allow said plurality of power storage devices to communicate electric power therebetween when said plurality of power storage devices are charged from said power supply,
said control device including
an electric power control value generation unit generating a charging electric power control value indicating a target value for an electric power charged from said power supply to said plurality of power storage devices when said plurality of power storage devices are charged from said power supply,
a unit generating a temperature increasing electric power control value based on a temperature of one of said plurality of power storage devices to allow at least two of said plurality of power storage devices to communicate electric power therebetween through said electric power line for increasing temperature, and
a signal generation unit generating a drive signal for driving a plurality of conversion units based on said charging electric power control value and said temperature increasing electric power control value.

2. The motored vehicle according to claim 1, wherein said control device determines the electric power communicated between said plurality of power storage devices, as based on the electric power that said electric power receiving unit receives.

3. The motored vehicle according to claim 2, wherein said control device determines, as the electric power communicated between said plurality of power storage devices, an electric power obtained by subtracting, from an allowable input electric power of a power storage device of said plurality of power storage devices that serves as an electric power receiving side when said plurality of power storage devices communicate electric power therebetween, an electric power supplied from said electric power receiving unit to said power storage device serving as said electric power receiving side.

4. The motored vehicle according to claim 1, wherein said control device controls said voltage conversion device to allow said plurality of power storage devices to communicate the electric power therebetween when any of said plurality of power storage devices has a temperature less than or equal to a defined temperature.

5. The motored vehicle according to claim 1, wherein:
said power supply external to the vehicle is a commercial AC power supply; and
said voltage conversion device includes
a first conversion unit receiving AC power from said commercial AC power supply and converting the received AC power to DC power,
an electric power line outputting said DC power received from said first conversion unit, and
a plurality of second conversion units associated with said plurality of power storage devices and each converting voltage between said electric power line and a power storage device of said plurality of power storage devices that is associated therewith.

6. The motored vehicle according to claim 5, wherein:
said plurality of power storage devices include first and second power storage devices;
said plurality of second conversion units include first and second converters; and
said control device includes
a current control unit controlling said first converter to allow said first power storage device to charge/discharge a target current, and
a voltage control unit controlling said second converter to allow said electric power line to have a target voltage.

7. The motored vehicle according to claim 5, wherein:
said plurality of power storage devices include first and second power storage devices;
said plurality of second conversion units include first and second converters; and
said control device includes
a first current control unit controlling said first converter to allow said first power storage device to charge/discharge a first target current, and
a second current control unit controlling said second converter to allow said second power storage device to charge/discharge a second target current.

8. The motored vehicle according to claim 5, wherein:
said motor is a first AC rotating electric machine including a star-connected first polyphase winding as a stator winding;
said first conversion unit includes
said first AC rotating electric machine,
a second AC rotating electric machine including a star-connected second polyphase winding as a stator winding, first and second inverters associated with said first and second AC rotating electric machines, respectively, and connected in parallel with each other to said electric power line, and an inverter control unit controlling said first and second inverters;

said electric power receiving unit provides the AC power received from said commercial AC power supply to said first polyphase winding and said second polyphase winding at a first neutral point and a second neutral point, respectively; and said inverter control unit controls said first and second inverters to convert the AC power received at said first and second neutral points into DC power and output the DC power to said electric power line.

9. A method of controlling a voltage conversion device mounted in a motored vehicle including a plurality of chargeable power storage devices, a motor using electric power received from said plurality of power storage devices to generate driving power for the vehicle, an electric power receiving unit receiving electric power from a power supply external to the vehicle for charging said plurality of power storage devices, and said voltage conversion device connected to said electric power receiving unit and said plurality of power storage devices, said voltage conversion device being configured to convert in voltage the electric power that said electric power receiving unit receives and output the converted electric power to said plurality of power storage devices, and also allow said plurality of power storage devices to communicate electric power therebetween, the method comprising the steps of:

determining whether charging said plurality of power storage devices from said power supply is requested; and when charging said plurality of power storage devices from said power supply is requested, controlling said voltage conversion device to charge said plurality of power storage devices from said power supply and also allow said plurality of power storage devices to communicate electric power therebetween, the method further including:

generating a charging electric power control value indicating a target value based on an electric power charged from said power supply to said plurality of power storage devices when said plurality of power storage devices are charged from said power supply, generating a temperature increasing electric power control value based on a temperature of one of said plurality of power storage devices to allow at least two of said plurality of power storage devices to communicate electric power therebetween through said electric power line for increasing temperature, and generating a drive signal for driving a plurality of conversion units based on said charging electric power control value and said temperature increasing electric power control value.

10. The method of controlling a voltage conversion device according to claim 9, further comprising the step of determining the electric power communicated between said plurality of power storage devices, as based on the electric power that said electric power receiving unit receives, wherein the step of controlling includes controlling said voltage conversion device to allow said plurality of power storage devices to communicate therebetween the electric power determined in the step of determining the electric power.

11. The method of controlling a voltage conversion device according to claim 10, wherein in the step of determining the electric power, an electric power obtained by subtracting, from an allowable input electric power of a power storage device of said plurality of power storage devices that serves as an electric power receiving side when said plurality of power storage devices communicate electric power therebetween, an electric power supplied from said electric power receiving unit to said power storage device serving as said electric power receiving side, is determined as the electric power communicated between said plurality of power storage devices.

12. The method of controlling a voltage conversion device according to claim 9, further comprising the step of determining whether any of said plurality of power storage devices has a temperature less than or equal to a defined temperature, wherein when in the step of determining whether any of said plurality of power storage devices has a temperature less than or equal to the defined temperature a decision is made that any of said plurality of power storage devices has a temperature less than or equal to the defined temperature, then in the step of controlling, said voltage conversion device is controlled to allow said plurality of power storage devices to communicate electric power therebetween.

13. The motored vehicle according to claim 1, wherein:

said plurality of power storage devices include first and second power storage devices; and said voltage conversion device includes
a first conversion unit receiving AC power from said power supply and converting the received AC power to DC power,
an electric power line outputting the DC power received from said first conversion unit,
a second conversion unit associated with said first power storage device and converting voltage between said electric power line and said first power storage device, and
a third conversion unit associated with said second power storage device and converting voltage between said electric power line and said second power storage device.

14. The method of controlling a voltage conversion device according to claim 9, wherein:

said plurality of power storage devices include first and second power storage devices; and said voltage conversion device includes
a first conversion unit receiving AC power from said power supply and converting the received AC power to DC power,
an electric power line outputting the DC power received from said first conversion unit,
a second conversion unit associated with said first power storage device and converting voltage between said electric power line and said first power storage device, and
a third conversion unit associated with said second power storage device and converting voltage between said electric power line and said second power storage device.

15. The motored vehicle according to claim 1, wherein:

said target value is calculated based on a vehicular required power when external charging of said plurality of power storage devices is on, and said target value is calculated based on said charging electric power control value when external charging of said plurality of power storage devices is off.

* * * * *